(12) United States Patent
Blaies et al.

(10) Patent No.: US 12,510,243 B2
(45) Date of Patent: Dec. 30, 2025

(54) GENERATE HYDROGEN AS FUEL AT NATURAL GAS PROCESSING PLANT TO REDUCE CARBON DIOXIDE EMISSIONS

(71) Applicant: Saudi Arabian Oil Company, Dhahran (SA)

(72) Inventors: Wael F. Blaies, Dhahran (SA); Mohammed A. Al-Mahmood, Dhahran (SA); Mohammed A. AlQahtani, Dhahran (SA); Fawaz A. Alwarthan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 396 days.

(21) Appl. No.: 18/109,059

(22) Filed: Feb. 13, 2023

(65) Prior Publication Data

US 2024/0271779 A1    Aug. 15, 2024

(51) Int. Cl.
*F23C 1/00*    (2006.01)
*B01D 53/14*    (2006.01)
(Continued)

(52) U.S. Cl.
CPC ............ *F23C 1/00* (2013.01); *B01D 53/1462* (2013.01); *B01D 53/263* (2013.01); *C01B 17/04* (2013.01); *C02F 1/048* (2013.01); *C10L 3/101* (2013.01); *C10L 3/103* (2013.01); *C10L 3/104* (2013.01); *C10L 3/106* (2013.01); *C25B 1/04* (2013.01); *C25B 9/19* (2021.01); *C25B 15/08* (2013.01); *B01D 2252/204* (2013.01);
(Continued)

(58) Field of Classification Search
CPC ..... F23C 1/00; B01D 53/1462; B01D 53/263; C01B 17/04; C02F 1/014; C10L 3/101; C10L 3/103; C10L 3/104; C10L 3/106; C25B 15/08; C25B 9/19; C25B 1/04
USPC .............................................................. 431/2
See application file for complete search history.

(56) References Cited

U.S. PATENT DOCUMENTS 3,262,872 A    7/1966    Rhodes et al.
4,726,888 A    2/1988    McCambridge
(Continued)

FOREIGN PATENT DOCUMENTS

CN    104364424    9/2018
WO    WO 2010151157    12/2010

OTHER PUBLICATIONS

Jansen et al., "Refineries of the Future—The Refinery as an Energy Hub," Society of Petroleum Engineers, Oct. 2019, 10 pages.
(Continued)

*Primary Examiner* — Vivek K Shirsat
(74) *Attorney, Agent, or Firm* — Fish & Richardson P.C.

(57) ABSTRACT

Operating a natural gas processing plant, including receiving feed natural gas and processing the feed natural gas to give product natural gas. The processing includes removing acid gas, water, and non-methane hydrocarbons from the feed natural gas. The method includes providing fuel to a furnace and combusting the fuel in the furnace to heat a boiler to generate steam. The method generating steam with an HRSG. The method includes subjecting blowdown water from the boiler and the HRSG to electrolysis, thereby generating hydrogen gas. The method includes combining the hydrogen gas with the fuel and combusting the hydrogen gas in the furnace.

20 Claims, 12 Drawing Sheets

(51) Int. Cl.
| | |
|---|---|
| *B01D 53/26* | (2006.01) |
| *C01B 17/04* | (2006.01) |
| *C02F 1/04* | (2023.01) |
| *C02F 103/02* | (2006.01) |
| *C10L 3/10* | (2006.01) |
| *C25B 1/04* | (2021.01) |
| *C25B 9/19* | (2021.01) |
| *C25B 15/08* | (2006.01) |

(52) U.S. Cl.
CPC .. *B01D 2256/245* (2013.01); *B01D 2257/304* (2013.01); *B01D 2257/504* (2013.01); *B01D 2257/7022* (2013.01); *B01D 2257/80* (2013.01); *C02F 2103/023* (2013.01); *C10L 2290/08* (2013.01); *F23C 2900/9901* (2013.01)

(56) References Cited

U.S. PATENT DOCUMENTS

| | | | |
|---|---|---|---|
| 7,241,950 | B2 | 7/2007 | Fan et al. |
| 7,326,329 | B2 | 2/2008 | Gomez |
| 7,331,179 | B2 | 2/2008 | Balan et al. |
| 7,364,810 | B2 | 4/2008 | Sridhar et al. |
| 8,642,002 | B2 | 2/2014 | Choi et al. |
| 9,440,866 | B2 | 9/2016 | Legzdins |
| 10,208,665 | B2 | 2/2019 | Simpson |
| 10,422,046 | B2 | 9/2019 | Koseoglu |
| 10,487,408 | B2 | 11/2019 | Rothschild et al. |
| 11,161,076 | B1 | 11/2021 | Van der Walt et al. |
| 12,031,508 | B1 * | 7/2024 | Fimml .............. F02M 26/35 |
| 2005/0241311 | A1 * | 11/2005 | Pronske ............ F25J 3/04545 60/648 |
| 2009/0107143 | A1 * | 4/2009 | Zachar .............. F02C 1/007 60/659 |
| 2011/0000221 | A1 | 1/2011 | Minta et al. |
| 2011/0062722 | A1 | 3/2011 | Sirdeshpande et al. |
| 2013/0153438 | A1 | 6/2013 | Ab Wahid et al. |
| 2014/0203557 | A1 | 7/2014 | Kim et al. |
| 2024/0279563 | A1 | 8/2024 | Blaies et al. |

OTHER PUBLICATIONS

Thai et al., "Injecting Hydrogen Into Natural Gas Pipelines at Congested Solar Farms for Transportation Fuel," Pipeline Simulation Interest Group, May 2022, 12 pages.

Ozturk et al., "Development of renewable energy system integrated with hydrogen and natural gas subsystems for cleaner combustion," Journal of Natural Gas Science And Engineering, Nov. 1, 2020, 83:103583, 8 pages.

Sorgulu et al., "Thermoeconomic and impact assessments of trigeneration systems with various fuels," Fuel, Jun. 1, 2022, 317:123503, 13 pages.

International Search Report and Written Opinion in International Appln. No. PCT/US2024/015544, mailed on Jun. 11, 2024, 13 pages.

International Search Report and Written Opinion in International Appln. No. PCT/US2024/015117, mailed on Jun. 17, 2024, 12 pages.

* cited by examiner

400

800

1000

GENERATE HYDROGEN AS FUEL AT NATURAL GAS PROCESSING PLANT TO REDUCE CARBON DIOXIDE EMISSIONS

TECHNICAL FIELD

This disclosure relates to reducing carbon dioxide emissions at a natural gas processing plant.

BACKGROUND

A natural gas (NG) processing plant may be a facility that "cleans" raw natural gas to produce what is known as 'pipeline quality' dry natural gas. The NG processing plant may employ multiple unit operations to process the natural gas.

Carbon dioxide is the primary greenhouse gas emitted through human activities. The reduction of $CO_2$ emissions at a facility may beneficially reduce the $CO_2$ footprint of the facility.

Hydrogen is commercially produced, such as from fossil fuels. Hydrogen may be produced, for example, through reforming of hydrocarbons. The reforming of methane is the most prevalent source of hydrogen production. Bulk hydrogen is typically produced by the steam reforming of natural gas (methane). Conventional steam reforming includes heating the natural gas (e.g., to between 700° C. to 1100° C.) in the presence of steam and a nickel catalyst. This endothermic reaction generates carbon monoxide and hydrogen. The carbon monoxide gas can be subjected to a water-gas shift reaction to obtain additional hydrogen.

SUMMARY

An aspect relates to a method of operating a natural gas processing plant, including receiving feed natural gas and processing the feed natural gas to give product natural gas. The processing includes removing impurities including acid gas, water, and non-methane hydrocarbons from the feed natural gas. The method includes providing fuel to a furnace and combusting the fuel in the furnace to heat a boiler to generate steam. The method includes flowing flue gas through an HRSG to generate steam. The method includes subjecting blowdown water from the boiler and the HRSG to electrolysis, thereby generating hydrogen gas. The method includes combining the hydrogen gas with the fuel and combusting the hydrogen gas in the furnace.

Another aspect relates to a method of operating a natural gas processing plant, includes receiving feed natural gas from a wellhead and removing impurities including acid gas, water, and hydrocarbons from the feed natural gas to give product natural gas. The method includes providing fuel to a burner, combusting the fuel via the burner to provide heat for a boiler to generate steam, and generating additional steam with an HRSG. The method includes discharging blowdown water from the boiler and the HRSG and electrolyzing the blowdown water via a water electrolysis unit, thereby generating hydrogen gas. The water electrolysis unit includes an electrochemical cell having a cathode, an anode, and an electrolyte. The method includes combining a first portion of the hydrogen gas with the fuel provided to the burner.

Yet another aspect relates to a method of operating a natural gas processing plant, including receiving feed natural gas from a wellhead system coupled to a wellbore through which the feed natural gas is produced from a subterranean formation. The method includes processing the feed natural gas for provision of natural gas as product, wherein the processing includes removing acid gas, water, and hydrocarbons having a greater molecular mass than methane from the feed natural gas. The method includes discharging blowdown water from a boiler and an HRSG to an evaporation pond, and diverting a portion of the blowdown water before reaching the evaporation pond. The method includes treating the portion to reduce conductivity of the portion and subjecting the portion to electrolysis, thereby generating hydrogen gas. The method includes combusting fuel and a first portion of the hydrogen gas in a furnace associated with the boiler or the HRSG, or both, to generate steam.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
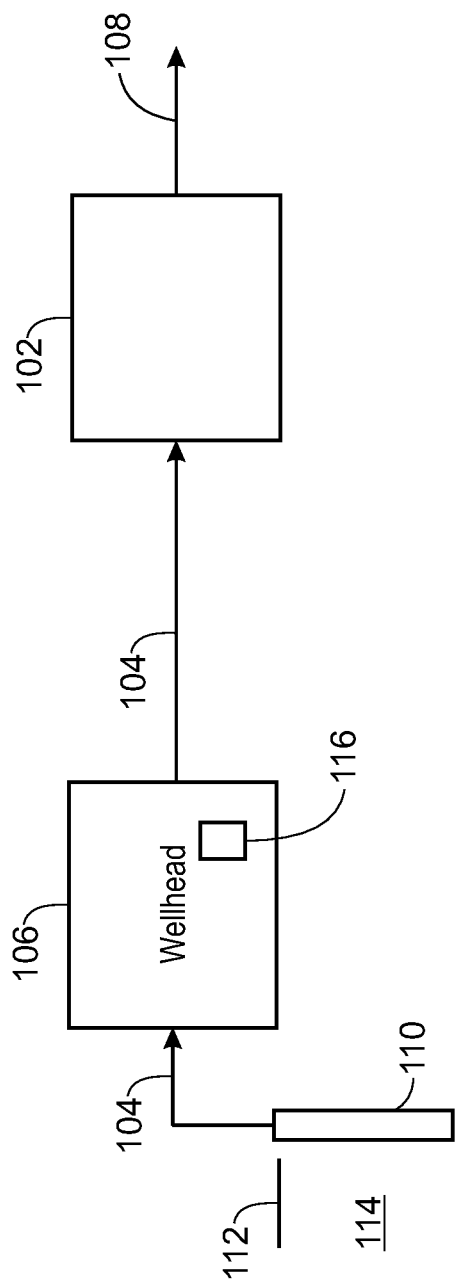
FIG. 1 is a diagram of a system for producing natural gas including a natural gas (NG) processing plant that receives feed natural gas.

A natural gas (NG) processing plant may receive feed natural gas including raw natural gas produced from a subterranean formation. Embodiments include operating the NG processing plant to remove components (e.g., acid gas, water, hydrocarbons, etc.) from the feed natural gas to give natural gas as product. Unfortunately, carbon dioxide ($CO_2$) may be emitted to the environment (to atmosphere) at the NG processing plant.

Some aspects of the present disclosure are directed to subjecting blowdown water in a NG processing plant to electrolysis to generate hydrogen gas that supplements fuel (e.g., natural gas) combusted. In so utilizing (combusting) the hydrogen gas, the amount of the natural gas combusted is reduced, therefore reducing emissions of carbon dioxide from the plant. Prior to (upstream of) the electrolysis, the blowdown water may be treated, for example, to reduce conductivity of the blowdown water. The electrolysis may utilize electricity to split water into hydrogen gas and oxygen gas. This conversion may occur via a cathode, an anode, and an electrolyte upon the power (electrical) input. This electrolysis may break the bonds of the water to produce hydrogen and oxygen.

In operation of the NG processing plant, fuel is combusted for a boiler and a heat recovery steam generator (HRSG). Blowdown water from the boiler and the HRSG may discharge, for example, to an evaporation pond. A portion of the blowdown water may be diverted to a water electrolysis unit for the electrolysis to generate the hydrogen gas. A portion of the hydrogen gas may be provided to a furnace or burner for the combustion. Another portion of the hydrogen gas may be provided to users external of the NG processing plant. The addition of the hydrogen gas to the fuel may reduce the amount of carbon dioxide ($CO_2$) generated in the combustion.

A NG processing plant may be a facility that "cleans" raw natural gas by separating impurities and various non-methane hydrocarbons and fluids to produce product natural gas or what may be known as 'pipeline quality' dry natural gas. The NG processing plant employs multiple systems/units and unit operations to process the natural gas.

Fuel, such as natural gas, may be combusted at the NG processing plant to generate steam for use at process facilities in the NG processing plant. The steam may be employed as a heating medium. The steam may be utilized to drive a gas turbine in the NG processing plant for power generation, such as in a power generation unit (or power block) or power plant at the NG processing plant facility.

Unfortunately, carbon dioxide ($CO_2$) may be emitted to the environment (to atmosphere) at the NG processing plant in the combustion of the fuel to generate steam (and electricity). The generation of hydrogen gas from blowdown water and the use of the hydrogen gas to supplement the fuel in the combustion may beneficially reduce $CO_2$ emissions. The combustion of hydrogen gas does not generate $CO_2$. Conversely, the combustion of methane (and/or other hydrocarbons) typically in the fuel generates $CO_2$.

FIG. 1 is a system 100 for producing natural gas including a NG processing plant 102 that receives feed natural gas 104 via an inlet conduit (supply conduit) from a wellhead 106 (or multiple wellheads 106) or from a wellhead system. The inlet conduit may be known as a natural gas pipeline. The NG processing plant 102 may discharge product natural gas 108 via an outlet conduit (discharge conduit) for distribution to users.

In implementations, the natural gas 104 may be characterized as a feed stream (e.g., a main feed stream) from a producing well or multiple producing wells to a NG processing plant. The NG processing plant 102 may be in fluid communication with the wellhead 106 for receipt of the feed natural gas 104 from the wellhead 106. In certain implementations of the provision of the feed natural gas 104 to the NG processing plant 102, the wellhead 106 and the NG processing plant 102 may act in concert as a continuous operation.

In implementations, the wellhead 106 pressure may provide motive force for flow of the natural gas 104 to the NG processing plant 102. In some implementations, a mechanical compressor (not shown) can be disposed along the natural gas pipeline to provide motive force (e.g., as a supplement to the wellhead 106 pressure) for flow of the natural gas 104 from the wellhead 106 to the NG processing plant 102. Similarly, a mechanical compressor can be disposed along the outlet conduit to provide motive force for flow of the treated natural gas 108 (product) to users.

Vessels (e.g., knockout pots, such as in compressor stations) may be disposed along the natural gas pipeline conveying the feed natural gas 104 to remove liquid (e.g., water) from the feed natural gas 104. Filters (e.g., coreless filters or a filter housing having internal filter cartridges or filter bags, etc.) along the pipeline (e.g., near or at the entry to the NG processing plant 102) may remove black powder that forms in the pipeline.

In certain implementations, the natural gas 104 received from the wellhead 106 may be sour natural gas having acid gas. Acid gas is primarily $H_2S$ and $CO_2$, and can include similar acidic gases.

The NG processing plant 102 processes the feed natural gas 104 for distribution of product natural gas 108 to downstream users. The NG processing plant 102 may receive and purify the feed natural gas 104, and discharge pipeline quality dry natural gas as product natural gas 108 for end users. The natural gas used by consumers is typically composed almost entirely of methane.

The natural gas 104 produced through the wellhead 106 and through the inlet conduit to the natural gas processing plant 102 may include primarily methane ($CH_4$), for example, in the range of 55 volume percent (vol %) to 85 vol %. The natural gas 104 may include higher alkanes (e.g., ethane, propane, butane) and other components (e.g., acid gas, water vapor, nitrogen, etc.).

In some implementations the flow rate (e.g., volumetric rate, mass rate, or molar rate) of the natural gas 104 fed to the NG processing plant 102 may be controlled via at least one flow control valve disposed along the inlet (supply) conduit or by a mechanical compressor, or a combination thereof. In implementations, the supply pressure of the feed natural gas 104 may provide for or facilitate the operating pressure of the gas 104 at the inlet portion of the NG processing plant 102.

The system 100 may include a gas well (or oil and gas well) having the wellhead 106 coupled to a wellbore 110 formed through the Earth surface 112 into a subterranean formation 114. The natural gas 104 may be produced from the subterranean formation 114 through the wellbore 110 to the wellhead 106. For the wellbore 106 as a cemented cased wellbore, the natural gas 104 may flow into the wellbore 106 from the subterranean formation 114 through perforations in the cement and the casing.

The natural gas 104 as produced from the formation 114 and discharged from the wellbore 110 to the wellhead 106 may have liquid (e.g., crude oil, condensate, water, etc.). In those instances, liquid can be removed from the natural gas 104 at or near the wellhead 106 in certain implementations. A separator 116 at the wellhead 106 may be employed to separate liquid from the natural gas 104. In some examples, the separator 116 may include a vessel or piping for separation of liquid from the natural gas. Water vapor may remain in the natural gas 104 and be separated, for instance, at the downstream NG processing plant 102 via dehydration (e.g., glycol dehydration).

In certain examples, the natural gas 104 and the produced liquid may separate due to decreased pressure at the wellhead 106. In these cases, the separator 116 may be a vessel, such as a closed tank, where gravity serves to separate the liquid and natural gas 104. In examples, the separator 116 may be a low-temperature separator (LTX) that may include a heat exchanger, a choke to expand the gas, and liquid knockout vessel to separate liquid from the natural gas 104.

The natural gas 104 may flow from the wellhead 106 through a production manifold associated with one or more wellheads to the inlet conduit to the NG processing plant 102. The natural gas 104 received at the NG processing plant 102 may be from a well pool. In implementations, the natural gas 104 received at the NG processing plant 102 can be characterized as raw natural gas as produced from the subterranean formation 110 and that has been subjected to little or no processing.

Lastly, while the discussion herein has focused on natural gas 104, the stream 104 may instead be a methane stream (e.g., having $H_2S$ or acid gas, hydrocarbons in addition to methane, etc.). Sources of methane can include, for example, biogas or landfill gas. In general, the stream 104 as a methane stream can be a process stream or waste stream, or a stream from methane storage. As for storage supply, instead of a producing well having a wellhead 106 as the source of the stream 104, the source may be methane stored in refrigerated containers or methane stored in ground through gas reinjection, such as in a mined salt cavern or other subterranean formation.

Figure 2:
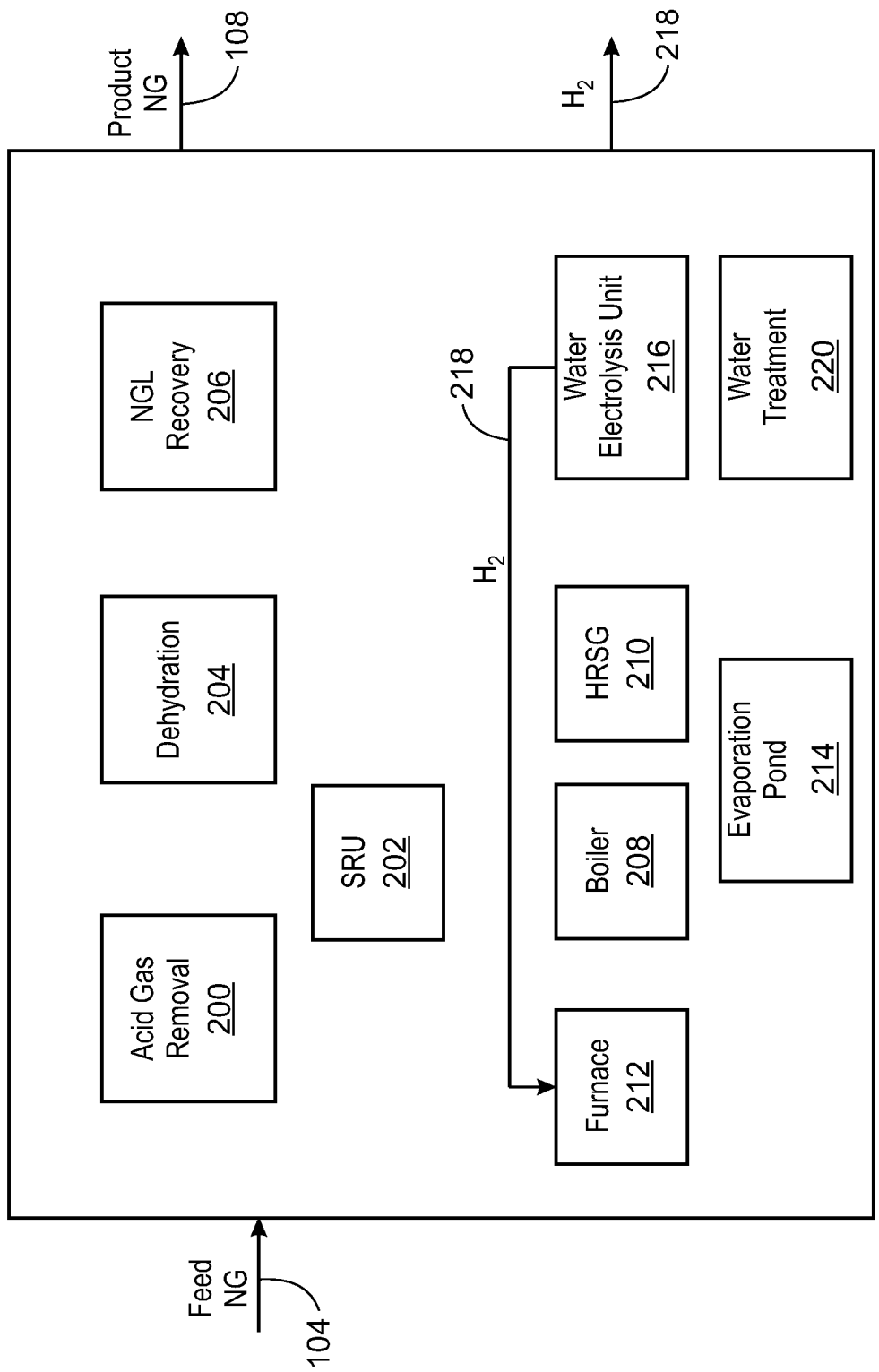
FIG. 2 is a diagram of an example of the NG processing plant of FIG. 1.

FIG. 2 is an example of the NG processing plant 102 that receives the feed natural gas 104. In operation, the NG processing plant 102, after processing the feed natural gas 104 via acid gas removal 200, dehydration 204, and NGL recovery 206 (and additional processing), discharges the processed feed natural gas as product natural gas 108.

At the inlet portion of the NG processing plant 102, the feed natural gas 104 may be subjected to initial processing. For instance, at the inlet portion of the NG processing plant 102, condensate or liquid water may be removed from the feed natural gas 104, such as via knockout pots or other vessels.

In the NG processing plant 102, the feed natural gas 104 may be subjected to acid gas removal 200 to remove acid gas including $H_2S$ and carbon dioxide. The acid gas may be removed from the feed natural gas 104 in an acid-gas removal system having a vessel to remove the acid gas. The acid-gas removal system can be an amine treating unit, Benfield process, Sulfinol® process, or pressure swing adsorption (PSA) unit, and the like. An acid-gas removal system as an amine treatment unit is a sweetening unit (e.g., amine treatment) to treat natural gas 104 (e.g., with a liquid amine solution) in a vessel (e.g., a tower) to remove $H_2S$ from the fee natural gas 104. The sweetening unit may receive the feed natural gas 104 as sour natural gas and discharge the feed natural gas 104 as sweet natural gas ("sweet gas"). In implementations, the liquid amine absorbs hydrogen sulfide ($H_2S$) from the feed natural gas 104. See, for example, FIG. 11.

The acid gas removed in the acid gas removal 200 can be sent to a sulfur recovery unit (SRU) 202. In certain instances, hydrogen sulfide can be considered a precursor to elemental sulfur. Sulfur recovery may refer to conversion of $H_2S$ to elemental sulfur, such as in an SRU 202, e.g., Claus system. The most prevalent technique of sulfur recovery is the Claus system, which may be labeled as the Claus process, Claus plant, Claus unit, and the like. The Claus system includes a thermal reactor (e.g., a furnace) and multiple catalytic reactor vessels to convert $H_2S$ into elemental sulfur that is removed (recovered).

The feed natural gas 104 (as sweet gas from the acid gas removal 200) may be subjected to dehydration 204. In the dehydration 204, water (moisture, water vapor, and/or liquid water) is removed from the feed natural gas 104 in a dehydration system having a vessel to remove the water. For example, such a dehydration system can be a glycol dehydration unit to remove water from the feed natural gas 104. A glycol dehydration unit has a vessel (e.g., FIG. 11) that is an absorber column (e.g., having packing) in which glycol, e.g., triethylene glycol (TEG), as a liquid desiccant absorbs water from the natural gas 104.

In certain implementations, some of this processed feed natural gas discharged as dehydrated sweet gas from the dehydration 204 can be fuel provided to a fuel gas supply system, and this fuel utilized as fuel 302 (see FIGS. 3-5 and 9) in the NG processing plant 102.

The feed natural gas 104 (e.g., as processed through dehydration as dehydrated sweet gas from the dehydration 204) may be subjected to NGL recovery 206 in which natural gas liquids (NGL) are removed (e.g., by refrigeration or absorption) from the feed natural gas 104 in a NGL recovery system (e.g., having a vessel to remove the NGL). Natural gas liquids (NGL) are components of natural gas that are separated from the gas state in the form of liquids. There are several types of natural gas liquids and different applications for NGL as products. Separating the NGL from the feed natural gas 104 can facilitate making for a cleaner, purer natural gas as product natural gas 108 that is pipeline ready for commercial, electric power, residential, and industrial use. The NGL removal can be implemented via cryogenic turboexpander recovery, mechanical refrigeration or cryogenic refrigeration (without expansion), absorption, etc. For instance, in absorption, an absorbing oil that has an affinity for NGL may be utilized in a vessel (e.g., absorption tower) to separate NGL from the natural gas. The oil laden with NGL may then be heated above the NGL boiling points to separate the NGL from the oil. The cryogenic techniques may decrease the temperature of the natural gas, for example, to about minus 120° F. At this temperature, the NGL condenses out of the feed natural gas 104 giving a methane stream or a methane-rich stream (e.g., greater than 99 vol % methane).

The NGL includes non-methane hydrocarbons, such as ethane, propane, butanes [normal butane (n-butane) and isobutane (i-butane)], pentanes, and heavier hydrocarbons (e.g., C6-C9). A mix of the pentanes and the heavier hydrocarbons can be characterized as natural gasoline. Liquid petroleum gas (LPG) that can be described as a blend of propane, n-butane, and i-butane. The NGL removed from the feed natural gas 104 may be subjected to fractionation (e.g., in a train of multiple distillation column vessels) to separate the NGL into respective hydrocarbons to be useful as individual products external of the NG processing plant 102. The train may start with the separation of lighter NGL components from the NGL removed from the feed natural gas 104. An example train is in the following order: deethanizer column (separate ethane), depropanizer column (separate propane), and debutanizer column (separate butanes), leaving the pentanes and heavier hydrocarbons in the NGL stream. A butane splitter column or deisobutanizer column may separate the isobutane and the normal butane.

The NG processing plant 102 includes a boiler 208 and a HRSG 210 that generates steam as a heating medium for users in the plant 102 in the processing of the feed natural gas 104 and other uses. The steam can also be employed to drive a steam turbine to generate power (electricity). A furnace 212 may combust fuel (e.g., natural gas, methane, etc.) to generate heat for the boiler 208 to vaporize water into the steam. The furnace 212 may be associated with the boiler 208. The furnace 212 may be a component of the boiler 208. The furnace 212 may be a burner of the boiler 208. Hot flue gas from the furnace 212/boiler 208 or from another furnace may be provided to the HRSG 210 to give heat for the HRSG 210 to vaporize water into the steam.

The water provided to be evaporated into steam at the boiler 208 and the HRSG 210 may include treated liquid water, such as demineralized water, boiler feedwater, steam condensate, etc. Boiler feedwater (BFW) may be treated water including demineralized water and can include steam condensate, and the like. The boiler feedwater may be a combination of fresh boiler feedwater (e.g., demineralized water plus treatment additives) and recycled boiler feedwater as steam condensate from the boiler or HRSG. In some instances, the centrifugal pumps that provide the water may be labeled as BFW pumps.

Blowdown water may discharge from the boiler 208 and the HRSG 210 to a system for treatment or disposal of the blowdown water, such as an evaporation pond 214. An evaporation pond may be a shallow body of water typically constructed with a relatively large surface area for purpose of allowing the water to dissipate through the effects of sunlight and heat. Evaporation ponds may also be utilized, for example, in wastewater treatment plants.

In embodiments of the present techniques, some of the blowdown water in route to the water treatment or disposal system (e.g., evaporation pond 214) may be diverted to a water electrolysis unit 216. The water electrolysis unit 216 may generate hydrogen gas 218 from the blowdown water.

In the water electrolysis unit, the electrolysis of water (e.g., blowdown water) is the decomposition of water into oxygen and hydrogen gas due to the passage of an electric current. The water electrolysis unit 216 may include at least one water-electrolysis electrochemical cell (electrolytic cell) having a pair of electrodes immersed in water. An electrolyte (e.g., sulfuric acid, potassium hydroxide, sodium hydroxide, etc.) may be added to the water. As discussed below, solid electrolytes are applicable. The pair of electrodes are a cathode and an anode. The cathode and anode may each be an inert metal, such as platinum, stainless steel, etc. In operation, an electric current may be provided to the cathode. The electrolysis of water may receive energy to overcome activation barriers. In implementations, energy for the electrolysis of water in the water electrolysis unit 216 may be provided from a standard electrical grid that provides electricity to the plant 102. Energy can be supplied via renewable sources, such as energy sources relying on wind or solar.

In the electrochemical cell of the water electrolysis unit 216, reduction of the water at the cathode generates $H_2$. Oxidation of water at the anode generates oxygen gas ($O_2$). The $H_2$ and $O_2$ may be collected separately. The overall equation of the decomposition of the water in the electrolytic cell can be $2H_2O \rightarrow 2H_2+O_2$. Therefore, the number of hydrogen molecules generated may be twice the number of oxygen molecules generated. The electrolysis of water via the water electrolysis unit 216 may produce $H_2$ and $O_2$ at a $H_2/O_2$ molar ratio of 2 to 1. The number of electrons through the water can be at least twice the number of generated hydrogen molecules and four times the number of generated oxygen molecules.

The hydrogen gas 218 generated may be sent to the furnace 212 for combustion in the furnace 212 to reduce the amount of fuel (typically natural gas) that is combusted in the furnace. The hydrogen gas 218 can be characterized as fuel. Thus, the fuel fed to the furnace 212 may be a combination of the hydrogen gas plus the typical fuel (natural gas) for combustion in a furnace. A portion of the hydrogen gas 218 may be sent off-site as product to be stored or distributed to users that are external to the plant 102.

The diverted blowdown water prior to (upstream of) the water electrolysis unit 216 may be sent to water treatment 220 (e.g., water treatment unit, water treatment skid, etc.) to lower conductivity of the blowdown water. This treatment may be implemented before the blowdown water is subjected to electrolysis. In some embodiments, a water treatment skid may be disposed adjacent the water electrolysis unit 216.

The blowdown water from the boiler 208 and the HRSG 210 may have a conductivity, for example, of at least 5 micro-Siemens per centimeter (µS/cm), such as in the range of 5 µS/cm to 100 µS/cm, 20 µS/cm to 100 µS/cm, or 5 µS/cm to 20 µS/cm. The water treatment 220 may lower the conductivity of the blowdown water to less than 20 µS/cm, such as in the ranges of 10 µS/cm to 20 µS/cm, 5 µS/cm to 20 µS/cm, or 1 µS/cm to 20 µS/cm. The water treatment 220 may lower the conductivity of the blowdown water to less than 5 µS/cm, such as in the ranges of 2 µS/cm to 5 µS/cm, 1 µS/cm to 5 µS/cm, or 0.5 µS/cm to 5 µS/cm. The water treatment 220 may lower the conductivity of the blowdown water to less than 2 µS/cm. The target or specified/desired conductivity in the water treatment may depend, for example, on design criteria and/or technology warranty of the water electrolysis unit 216.

The conductivity of water can be reduced, for example by removing the number of dissolved solids (e.g., including minerals) in the water. The total dissolved solids (TDS) may be lowered, for example, by reverse osmosis or ion exchange (e.g., via flocculation or ion exchange resin). Thus, to lower (reduce) the conductivity, the water treatment 220 may employ, for instance, a reverse osmosis (RO) unit having an RO vessel (housing) with an RO membrane, or employ flocculation (via addition of flocculating agents) in a settling vessel, or flowing the blowdown water through a vessel or cartridge having ion exchange resin.

An RO system may be a form of water purification where unwanted molecules, ions, minerals, and large particles are separated by force from the water via a semipermeable membrane (partially permeable membrane). In implementations, an ion exchange demineralization cartridge can be added after the RO process to further reduce the conductivity (e.g., to less than 1 µS/cm).

Flocculation may involve adding a chemical coagulant [e.g., iron chloride (FeCl2/FeCl3) or iron nitrate (FeNO3)] as a flocculating agent to the water. Adding chemical coagulants facilitates bonding between the particles in the water, creating larger aggregates, and thus facilitating separation during sieving or settling in a vessel after flocculation.

Figure 3:
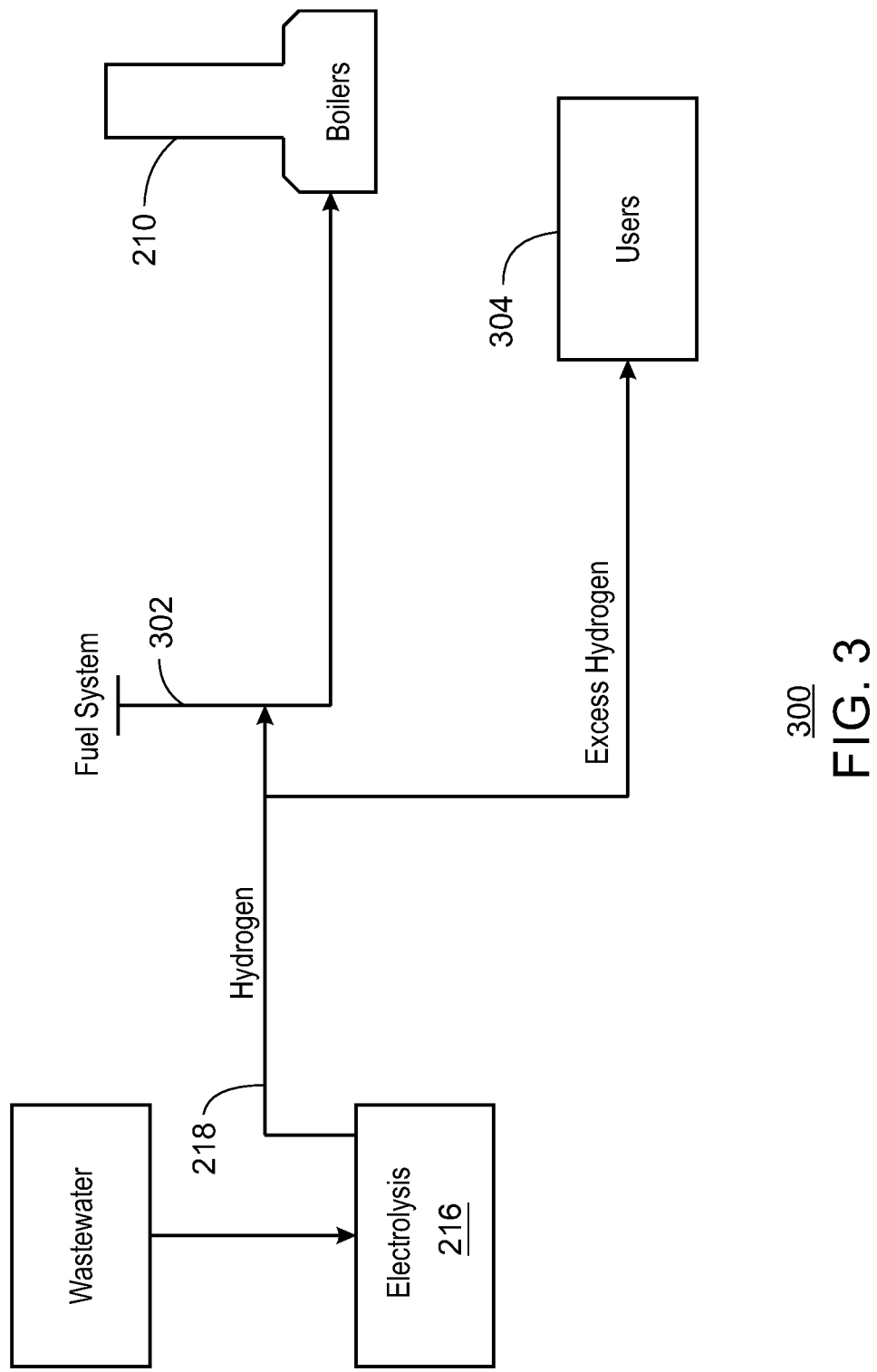
FIG. 3 is diagram of a steam generation system (that may also generate power).

FIG. 3 can be an example of a steam generation system 300 (that may also generate power) at the NG processing plant 102 of FIG. 2. Blowdown water (which can be labeled as wastewater) from the one or more boilers 208 and/or from one or more HRSGs (not shown) can be sent to a water electrolysis unit 218. While the blowdown water may be labeled as wastewater, the blowdown water in certain embodiments is generally good quality in not being excessively dirty or sour water. In implementations, the blowdown water is condensate water in the generation and processing of steam formed from BFW.

The blowdown water as discharged from the boiler 208 or HRSG may be collected for provision to the electrolysis unit 218. The collection may be in sense of discharging the blowdown water from the boiler 208 and HRSG and flowing the blowdown water through a conduit (pipe or piping). In the water electrolysis unit 218, the blowdown water is subjected to electrolysis to generate hydrogen gas 218, as discussed. The hydrogen gas 218 may be combined with fuel 302 sent to the boiler(s) for combustion. For the combustion, the fuel 302 with the added hydrogen gas 218 may flow to a burner(s) or a furnace(s) having a burner. The burner (or furnace having a burner) may be a component of, or otherwise associated with, the boiler 208.

The fuel 302 (e.g., natural gas) may be provided from the fuel gas supply system at the NG processing plan 102. The fuel 302 may flow, for example, from a conduit (e.g., header or subheader) of the fuel gas system to a furnace or burner of a boiler 208. In implementations, the fuel 302 is treated feed natural gas 104 that is sweet gas after removal of acid gas ($H_2S$ and $CO_2$) and upstream of NGL recovery, and thus may have a greater amount of heavier hydrocarbons (e.g., ethane, pentane, butanes, pentane, etc.) than in a pipeline product-grade natural gas. Therefore, reducing the amount of this intermediate grade of natural gas that is combusted can give significant reduction in generation and emission of carbon dioxide to the atmosphere. In one example, this intermediate grade of natural gas includes less than 93 mole percent (mol %) of methane, such as in the range of 89 mol % to 93 mol % of methane, or 91 mol % of methane. The remaining components in the composition of this intermediate grade of natural gas in this example includes ethane, propane, i-butane, n-butane, i-pentane, n-pentane, n-hexane, n-heptane, and nitrogen ($N_2$). The combustion (burning) of methane generates $CO_2$ and $H_2O$. In contrast, as mentioned, the combustion of $H_2$ does not generate $CO_2$.

Thus, the combining of the hydrogen gas 218 with the fuel 302 may lower (reduce) the amount of the fuel 302 provided to and combusted via a burner, thereby reducing emission of carbon dioxide to the environment. The amount of hydrogen gas 218 combined with the fuel 302 may depend on the design heating value of the furnace burner or boiler burner. In implementations, a maximum vol % of the hydrogen gas 218 in the blend of the fuel 302 and the hydrogen gas 218 is 50 vol %, 20 vol %, or 5 vol %. Therefore, in these implementations, the combining of the hydrogen gas 218 with the fuel 302 gives a mixture fed to the burner or furnace for combustion having less than 50 vol % of the hydrogen gas 218, less than 20 vol % of the hydrogen gas 218, or less than 5 vol % of the hydrogen gas 218. Thus, a volume ratio of the fuel 302 to the hydrogen gas 218 combined with the fuel 302 is, for example, at least 1, such as in a range of 1 to 32, 4 to 32, or 19 to 32. As for the inverse, a volume ratio of hydrogen gas 218 to the fuel 302 for the hydrogen gas 218 combined with the fuel 302 is less than 1, less than 0.25, or less than 0.05.

The hydrogen gas 218 generated in the electrolysis 218 not combined with fuel 302 for combustion for the boilers and HRSGs may be characterized as excess hydrogen gas. This amount of hydrogen gas 218 may be sent to other users 304, such as users external to the NG processing plant 102.

Figure 4:
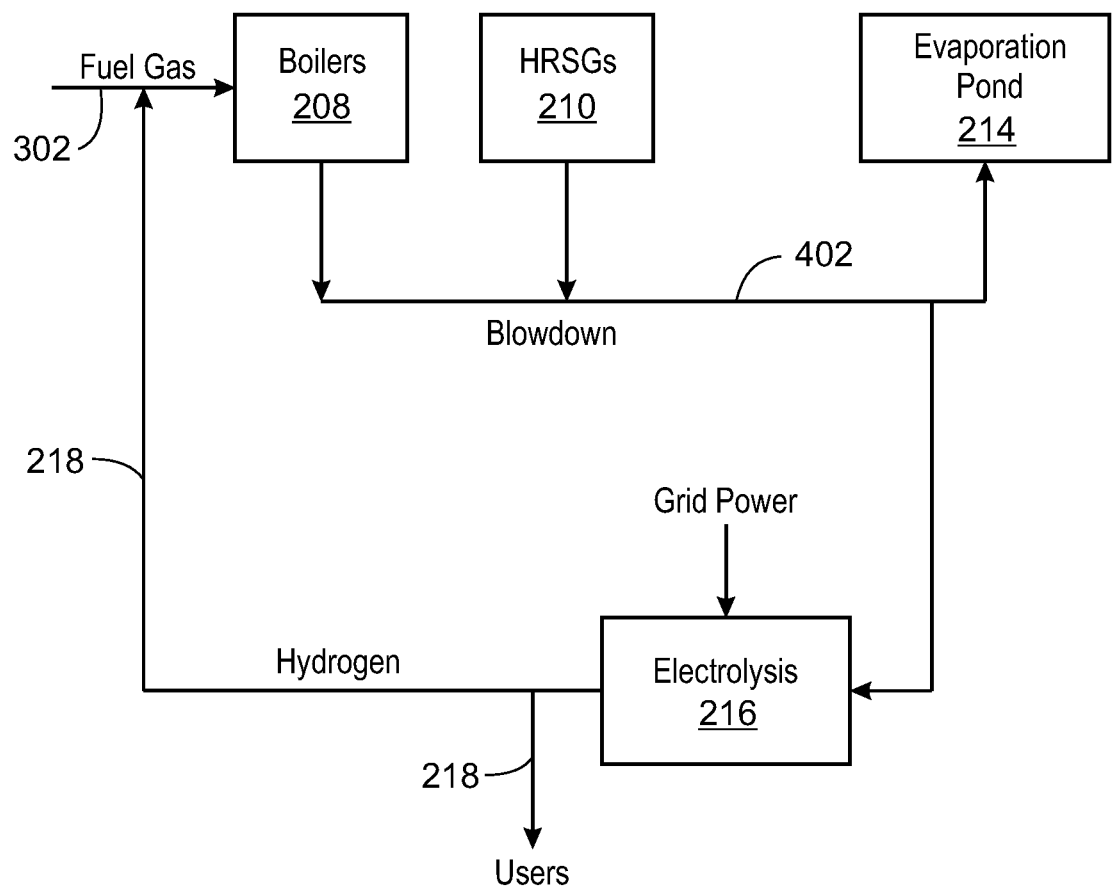
FIG. 4 is a diagram of a steam and power generation system at the NG processing plant of FIG. 2.

FIG. 4 is a steam and power generation system 400 at the NG processing plant 102 of FIG. 2. Boiler 208 systems (e.g., drum type, once through, etc.) may be employed to generate steam that is utilized (e.g., as a heating fluid) across the NG processing plant/facility (e.g., plant 102 of FIG. 2) for process requirements. The steam may also be utilized to drive a steam turbine to generate electricity (power). See, for example, FIG. 6.

The system 400 at the NG processing plant 102 may provide for co-generation of steam and electricity. For instance, combustion gas turbine generator (CGTG) systems for the co-generation of power and steam may be implemented. In embodiments, central to the steam generation may be an HRSG 210, in which high-temperature gases (e.g., having temperature in range of 593° C. to 610° C.) from a turbine are utilized to heat boiler feed water (BFW), generating high-pressure (HP) steam. The HP steam may be directed, for example, to a common steam header for use across the plant. The HP steam may be, for example, greater than 600 pounds per square inch gauge (psig). The power (electricity) generated from the turbines may be used for plant consumption and transferred to a broader electrical grid.

In the example of the Aramco Wasit Gas Plant (NG processing plant) in the Kingdom of Saudi Arabia, the steam network consists of two major systems: high-pressure (HP) and low-pressure (LP) steam systems. The HP steam is produced through a system of three boilers and four cogeneration units (e.g., having HRSGs). During normal operations, all four cogeneration units are online along with one or two boilers, depending on the required steam load. The LP steam is produced from the HP steam through two possible routes: either through two steam turbine generators (STG) or through pressure letdown stations. During normal operations, HP steam passes through the STGs to produce LP steam and power. As back up for the STGs, the Wasit Gas Plant (NG processing plant) is equipped with seven HP to LP letdown stations in case of STG outages. The Wasit Gas Plant is owned by Saudi Aramco or simply Armaco, officially the Saudi Arabian Oil Company having headquarters in Dhahran, Saudi Arabia.

In general for NG processing plants (e.g., 102), the steam generated or utilized may be low pressure (LP) steam (e.g., 150 psig or less), medium pressure (MP) steam (e.g., in the range of 150 psig to 600 psig), high pressure (HP) steam (e.g., 600 psig or greater, or in the range 600 psig to 1500 psig), or very high pressure (VHP) steam (e.g., 1500 psig or greater), and so forth. Generation of HP steam may generally be more valuable than generating MP steam or LP steam and thus improve economics of the plant. There may be different applications for the steam. Utilization of the steam by users receiving the steam may depend on the pressure or quality of the steam. In some implementations, higher steam pressures of the produced steam may give more versatility in the integration of the steam within the facility or plant. For instance, HP steam can be utilized to power turbines attached to compressors, while LP steam is typically used for heating purposes, and the like. MP steam may be employed which can be characterized as a higher value steam than LP steam. The source of LP steam and MP steam can include, for example, extraction turbines or letdown stations (depressurizing valve) for HP or VHP steam.

To protect the integrity of the boiler and HRSG systems, such as with respect to corrosion, scale deposition, impurity carryover etc., BFW may be water treated to accommodate stringent limits for parameters such as conductivity, pH, low dissolved oxygen, low TDS, low silica, hardness, alkalinity, etc. The water may be, for example, demineralized water and recovered steam condensate. The water for BFE may undergo both mechanical and chemical treatment to attain desired BFW parameter values. Mechanical treatment may include, for example, deaeration to lower the dissolved oxygen (e.g., to less than 20 parts per billion by weight). Chemical treatment can include addition of oxygen scavengers, addition of phosphates (phosphate treatment) for scale inhibition, and addition of volatile amines as corrosion inhibitors. Such treatments can protect the steam and condensate systems. The choices of mechanical and/or chemical treatments may be determined by the feedwater quality and the type of boiler system.

In implementations, the solids concentration in the boiler water system may be controlled by operating continuous blowdown (CBD) and/or intermittent blowdown (IBD). HP boilers and HRSGs may be operated, for example, with a target level for 1-2% CBD, corresponding to a cycle of concentration (COC) range of 50-100. Consequently, NG processing plants with multiple boilers and HRSGs can have significant water quantities disposed as blowdown water. In implementations, the CBD water quality can be good quality albeit of lesser quality than enhanced feedwater. Dependent upon boiler pressure and blowdown rates, the CBD water may have low TDS (compared to typical wastewater) with trace chemical additives. Table 1 below gives properties of blowdown water in one instance by CBD for the aforementioned example of the Wasit Gas Plant. Dissolved oxygen ($O_2$) was below measureable limits. The unit ppmw is part per million by weight.

TABLE 1

Example Properties of Blowdown Water from CBD

| | pH | Conductivity (μS/cm) | Iron (Fe) (ppmw) | TDS (ppmw) | $SiO_2$ (silica) (ppmw) | Phosphate (ppmw) |
|---|---|---|---|---|---|---|
| Boiler CBD | 9.5-10 | <20 | <2 | 13 | <2.5 | 20-30 |
| HRSG CBD | 9.5-10.5 | <20 | <2 | 10 | <2 | 10-15 |

In the illustrated embodiment of FIG. 4, blowdown water 402 from the boilers 208 (systems) and HRSGs 210 (systems) flows to an evaporation pond 218. The blowdown water 402 may be CBD and/or IBD from the boilers 208 and HRSGs 210.

Evaporation ponds may artificial ponds (body of water) with large surface area compared to depth that are designed to efficiently evaporate water by sunlight and expose water to the ambient temperatures. Evaporation ponds can be relatively inexpensive in facilitating wastewater treatment, storage, and extraction of minerals. Evaporation ponds generally operate best at shallow depths (and thus with a large amount of land usage). A shallow pond covering greater surface area may result in faster rates of evaporation. Evaporation pond liners that range in quality and cost are employed to prevent ground soil contamination. Evaporation pond liners may categorized, for example, as geomembrane, constructed bentonite clay, natural clay, etc. The evaporation pond includes water to be evaporated and solids (e.g., salts, minerals, etc.) that can be extracted. The sun will typically promote evaporation of water from the pond 218.

Some amount of the blowdown water 402 may be sent to the water electrolysis unit 216. A portion of the blowdown water 402 flowing to the evaporation pond 216 may be diverted to the water electrolysis unit 216. The portion of the blowdown water 402 sent to the water electrolysis unit 216 may have the same or similar composition as the portion of the blowdown water 402 that reaches the evaporation pond 218. The blowdown water 402 in route to the water electrolysis unit 216 may be treated (e.g., 220 of FIG. 2) to lower conductivity prior to electrolysis.

The water electrolysis unit 216 may include an electrolyzer or electrochemical cell having anodes and an electrolyte (e.g., liquid, solid, membrane, etc). In the water electrolysis unit 216, the blowdown water 402 is subjected to electrolysis to generate hydrogen gas 218. Electrolysis may be characterized as in the field of electrochemistry. In electrolysis, electricity (e.g., including from an electrical grid and/or renewable sources) is utilized to split water ($H_2O$) into hydrogen ($H_2$) and oxygen ($O_2$) in systems known as an electrolyzer. Electrolysis may produce hydrogen with little or no greenhouse gas emissions, depending on the source of electricity that drives the electrolysis. Electrolyzers (e.g., an electrochemical cell) may have an anode and a cathode separated by the electrolyte.

For the water electrolysis unit 216, the type of the electrolyzer (electrochemical cell) based on the electrolyte material may include, for example, a polymer electrolyte membrane (PEM) electrolyzer, an alkaline electrolyzer, a solid-oxide electrolyzer, or an anion exchange membrane (AEM) electrolyzer. The PEM of the PEM electrolyzer may be a solid polymer electrolyte that provides for conducting protons, separation of product gases, and electrical insulation of the electrodes. The alkaline electrolyzer may have an anode, cathode, and the electrolyte. This alkaline system utilizes a liquid electrolyte solution, such as potassium hydroxide (KOH) in water or sodium hydroxide (NaOH) in water, to produce hydrogen and oxygen gas. A solid-oxide electrolyzer cell generally runs in a regenerative mode to achieve the electrolysis of water by using a solid oxide (or ceramic) electrolyte to produce hydrogen gas and oxygen gas at high temperature (e.g., in the range of 700° C. to 1000° C.). The anion exchange membrane (AEM) combines the simplicity and efficiency of a PEM electrolyzer with the less harsh environment that alkaline electrolyzers operate, and facilitates use of non-noble catalysts and titanium-free components to produce hydrogen.

The hydrogen gas 218 produced (generated) by the water electrolysis unit 216 may be provided as fuel to the boilers 208. In particular, the hydrogen gas 218 may combine with the fuel 302 gas fed to combustion for the boilers 208 (and HRSGs 210), as discussed. The hydrogen gas 218 not utilized to combine with the fuel 302 may be sent to other users.

Figure 5:
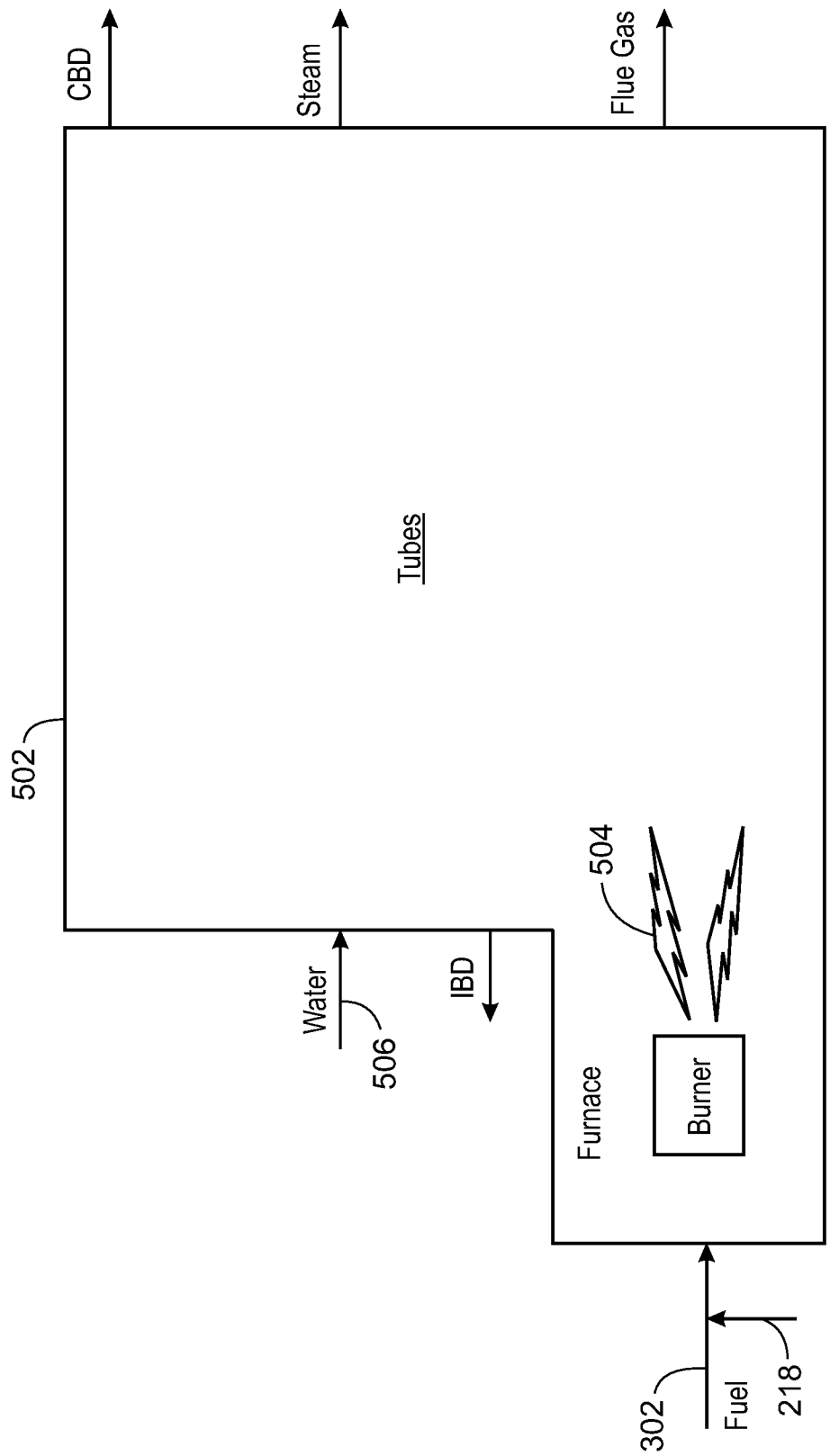
FIG. 5 is a diagram as a simplified representation of a boiler.

FIG. 5 is a simplified representation of a boiler 500. The boiler 500 may have a vessel wall or housing 502. The boiler 500 may be a vessel. Fuel 302 along with hydrogen gas 218 is fed to a burner of the boiler 500 and combusted with the burner emitting a flame 504. The flue gas (hot combusted gases) may flow from the burner through tubes for a fired-tube boiler or around the tubes (on the shell side) for a water-tube boiler. At the tubes, the region external to the tubes can be labeled as the shell side. The region of the boiler 500 having the burner can be called a furnace.

Liquid water 506 (e.g., BFW) may be fed to the boiler 500 to be vaporized into steam. At the tubes, the water 506 may flow on the shell side external to the tubes and be heated by the flue gas flowing through the tubes for a fire-tube boiler. On the other hand, for a water-tube boiler, the water 506 may flow through the tubes and be heated by the flue gas on the shell side. In either case, heat transfer occurs from the flue gas through the tube wall of the multiple tubes to the water to vaporize the water 506 into steam. Other configurations are applicable. For example, the multiple tubes can instead be a vessel in the boiler 500 and having the water 506 with the flame 504 and the flue gas heating the exterior of the vessel to vaporize the water 506 in the vessel into steam.

The flue gas may discharge from boiler 500. In examples, heat may be recovered from the discharged flue gas. For instance, the flue gas may be sent from the boiler 500 through a heat exchanger or to an HRSG. In implementations, flue gas may discharge from a boiler to an HRSG. In implementations, or the HRSG can receive flue gas from a furnace not associated with an upstream boiler.

A continuous blowdown (CBD) of blowdown water (e.g., 402 of FIG. 4) may discharge from the boiler 500. The blowdown water may be the feed water 506 being heated for vaporization in the boiler 500. The CBD may be labeled as a surface extraction in that the CBD may be generally withdrawn from an upper portion of the liquid water (upper portion of the liquid water level) in the boiler 500. An intermittent blowdown (IBD) (periodic blowdown) may discharge from the boiler 500. The IBD may be labeled as a bottom extraction in that the IBD can be generally withdrawn from a lower portion of the liquid water. In examples, the CBD and/or IBD can be withdrawn from a vessel (e.g., steam drum having steam and liquid water) associated with the boiler. The CBD and/or IBD may be the blowdown water 402 of FIG. 4. The blowdown water 402 of FIG. 4 may also include blowdown water from an HRSG.

In one example, the fuel 302 is pipeline product-grade natural gas. In another example, the fuel 302 is an intermediate grade of natural gas, such as sweet gas or sweet natural gas. This sweet gas can be feed natural gas from the wellhead minus removed acid gas (e.g., via amine treatment) and minus removed moisture (water) via dehydration (e.g., using glycol), but before NGL recovery. Therefore, this sweet natural gas utilized as the fuel 302 may have a greater amount of heavier hydrocarbons (e.g., ethane, pentane, butanes, pentane, etc.) than in pipeline product-grade natural gas.

In one implementation, the steam generated by the boiler 500 is HP steam and discharges from the boiler 500 through a turbine in a steam turbine generator (STG) to generate electricity. The steam may experience a pressure reduction in the STG and thus exit the STG, for example, as LP steam. The LP steam can discharge from the STG into a LP steam header (conduit) for routing to users in the NG processing plant 102 for use as a heating medium. In cases in which the STG is unavailable, the HP steam discharged from the boiler can be sent through a letdown station having a pressure-reducing valve to give LP steam provided to the LP steam header.

Figure 6:
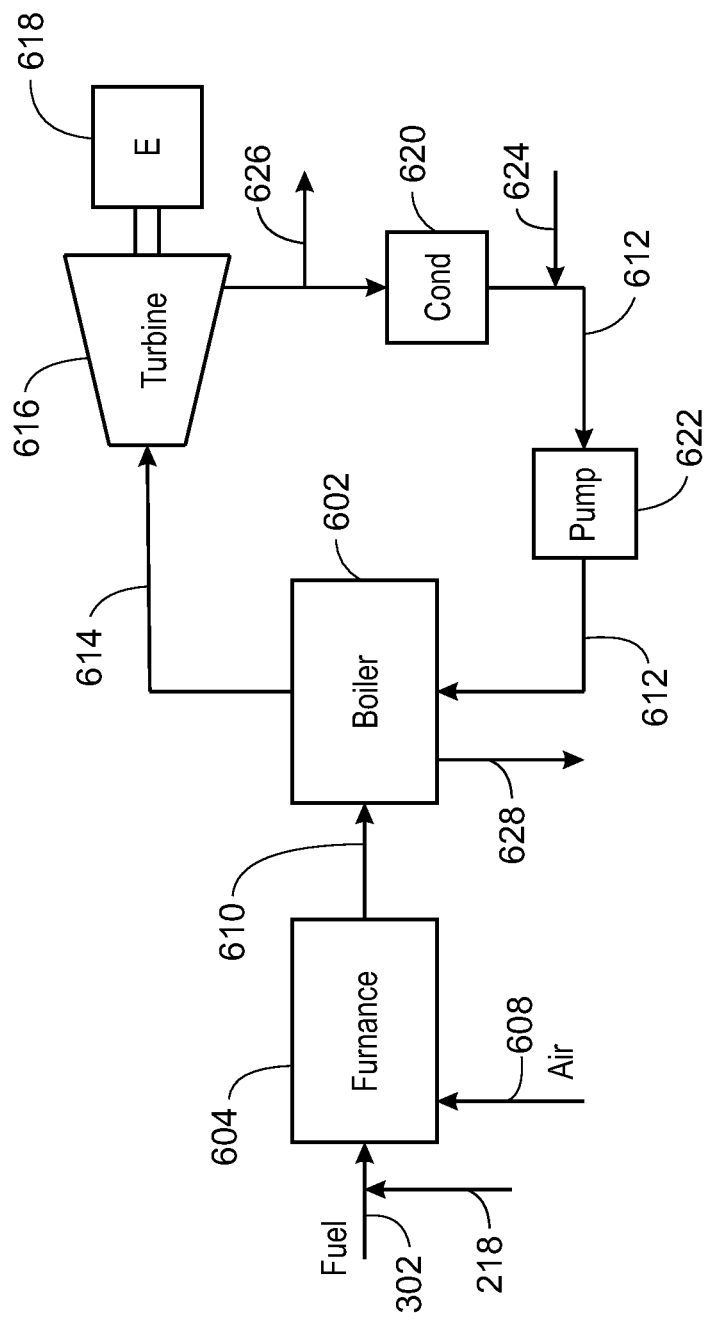
FIG. 6 is a diagram of a system for steam generation and power generation that may be disposed in a power block, power unit, or power plant of a NG processing plant.

FIG. 6 is a system 600 for steam generation and power generation. The system 600 may be disposed in a power block, power unit, or power plant of a NG processing plant 102. The system 600 includes a boiler 602. The system 600 includes a furnace 604 (burner) that combusts fuel 302. The fuel 302 may include natural gas 108 (e.g., pipeline product grade or the aforementioned sweet gas). Hydrogen gas 218 (e.g., generated via electrolysis of blowdown water) may be added to the fuel 302 for combustion. The furnace 604, while depicted separate from the boiler 602 for clarity, may be a boiler furnace as a component of the boiler 602. On the other hand, the furnace 604 may be upstream of the boiler 602, as depicted (e.g., for the boiler 602 as an HRSG).

In operation, the fuel 302 with added hydrogen gas 218 is ignited and combusted by burners in the furnace 604 with the aid of air 608 provided to the furnace 604. Hot combustion gas 610 (furnace exhaust gas or flue gas) from the furnace 604 heats boiler feedwater 612 in the boiler 602 to generate steam 614. The steam 614 (e.g., HP steam) drives the steam turbine 616, which in turn drives the steam-turbine generator 618 that generates electricity. In this illustrated example, the steam turbine 616 discharges the steam 614 to the condenser 620. The condenser 620 heat exchanger (e.g., shell-and-tube heat exchanger) may employ a cooling medium (e.g., water, such as cooling tower water) to condense the steam. The condenser 620 heat exchanger may discharge the condensed steam (steam condensate) as boiler feedwater 612 to the boiler feedwater pump 622 (e.g., centrifugal pump) that provides motive force for flow of boiler feedwater 612 to the boiler 602. Fresh boiler feedwater 624 as makeup can be combined with the boiler feedwater 612 from the condenser 620.

Downstream of the turbine 616 and upstream of condenser 620, steam 626 (e.g., LP steam) may be withdrawn and provided as a heating medium to users in the NG processing plant 102 (FIG. 2). In examples, the steam 614 discharged from the boiler 602 is HP steam that experiences a pressure drop across the turbine 616 to give LP steam discharged to the condenser 620 and as the steam 626 withdrawn from the circuit.

Blowdown water 628 (CBD and/or IBD) may be withdrawn from the boiler 602 or boiler 602 system. The blowdown water 628 may be sent to a water electrolysis unit to generate the hydrogen gas 218. The blowdown water 628 may be analogous to the blowdown water 402 of FIG. 4.

Figure 7:
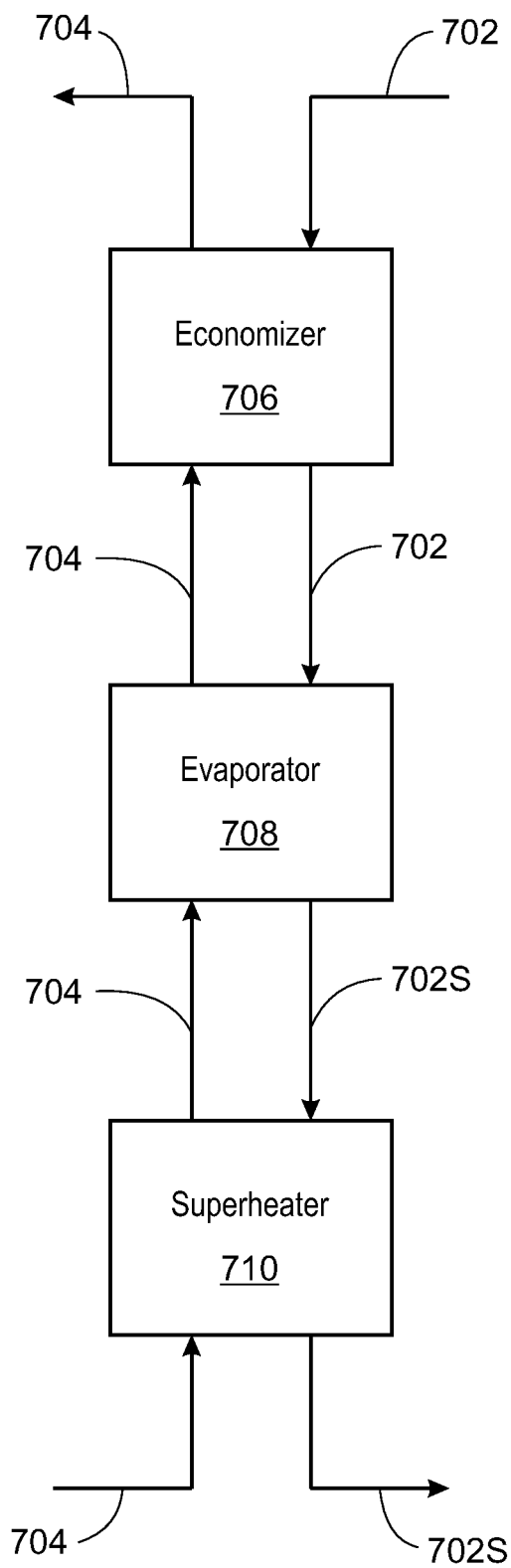
FIG. 7 is a diagram as a simplified representation of an HRSG.

FIG. 7 is a simplified representation of an HRSG 700. The HRSG 700 recovers heat from flue gas 704 to heat the boiler feedwater 702 to produce steam 702S. The flue gas 704 may be a hot gas stream that is combustion gas or furnace exhaust gas. The flue gas 704 may be formed by combustion of fuel 302 and hydrogen gas 218 (generated by electrolysis of blowdown water). See, e.g., FIGS. 3-4.

The produced steam 702S may be utilized, for example, to drive a steam turbine, such as in cogeneration or in a combined cycle, and the like, and/or utilized as a heating medium in the NG processing plant. The HRSG 700 may overall be called a heat exchanger. The HRSG 700 may generally be a vessel(s) having heat exchangers (e.g., 706, 708, and 710) and in which the boiler feedwater 702 flows through tubes and flue gas 704 flows through the vessel around the exterior of the tubes. Heat transfer occurs from the flue gas 704 outside of the tubes through the tube wall to the boiler feedwater 702 in the tubes. In the exchange of heat, the boiler feedwater 702 is heated and the flue gas 704 is cooled.

The flue gas 704 (e.g., combustion gas, furnace exhaust gas, hot waste gas, etc.) is provided to the HRSG 700 as a heating medium. Again, the flue gas 704 may be from a furnace that burns fuel (e.g., natural gas) and hydrogen gas in the presence of air to give the flue gas 704.

The HRSG 700 includes an economizer 706, evaporator 708, and superheater 710, among other components. The boiler feedwater 702 and the flue gas 704 may generally flow in a counter current flow with respect to each other through the HRSG 700.

The boiler feedwater 702 is provided to the economizer 706 that heats the boiler feedwater 702 with the flue gas 704. In some implementations, the boiler feedwater 702 may be pre-heated in a heat exchanger (upstream of the HRSG 700) prior to entry to the economizer 706 of the HRSG 300.

The economizer 706 may be, for example, of vertical design or horizontal design. While the economizer 706 may be of a shell-and-tube type with the vessel (e.g., duct) essentially as a shell, the economizer 706 in an HRSG may include fins or finned tubes. Economizer tubes may arranged horizontally in a vertical HRSG (exhaust flows vertically) and vertically in a horizontal HRSG (exhaust flows horizontally). Horizontal HRSGs may also have a horizontal tube arrangement, such as when the width of the HRSG is greater than the height of the HRSG.

In operation, the economizer 706 may heat the boiler feedwater 702 but typically not above the boiling point of the boiler feedwater 702. The heated boiler feedwater 702 may flow from the economizer 706 to the evaporator 708 of the HRSG 700. Again, the flow of the boiler feedwater 702 is typically counter current with respect to the flue gas 702 (heating medium).

The evaporator 708 is a heat exchanger that converts the liquid boiler feedwater 702 into steam 702S that may be saturated steam. The evaporator 708 may be called a steam generator or a boiler. The evaporator 708 may be a heat exchanger having tubes in which the boiler feedwater 702 flows through the tubes. The HRSG 700 vessel (e.g., duct, housing, pressure vessel, etc.) or other vessel may enclose the evaporator 708 tubes. The flue gas 704 may flow in the evaporator 708 through the vessel around the tubes. In the evaporator 708, the boiler feedwater 702 is heated with the flue gas 704 to evaporate the boiler feedwater 302 into steam. Steam 702S discharges from the evaporator 708. A steam drum (not shown) may be associated with (or included as a component of) the evaporator 706. The upstream boiler feedwater 702 as heated by the economizer 706 may be fed from the economizer 706 to the steam drum as feed to the evaporator 708. The steam 702S (e.g., saturated) may discharge from the steam drum as a discharge stream (outlet stream) from the evaporator 708 to the superheater 710.

The superheater 710 may be a heat exchanger that heats the entering steam 702S to increase the steam to above its saturation temperature to discharge the steam 702S as superheated. In other words, the superheater 710 as a heat exchanger may receive saturated steam 702S from the evaporator 708 and discharge superheated steam 702S. The superheater 710 may heat the steam 702S with the flue gas 704. The superheater 710 may have tubes in which in operation, the steam 702S is inside the tubes. Heat transfer in the superheater 710 may occur from the flue gas 704 on the exterior side of the tubes through the tube wall to the steam 702S in the tubes. The superheater 710 may discharge the superheated steam 702S to drive a steam turbine (e.g., to generate electricity in a cogeneration unit or a combined cycle) or for other applications.

Figure 8:
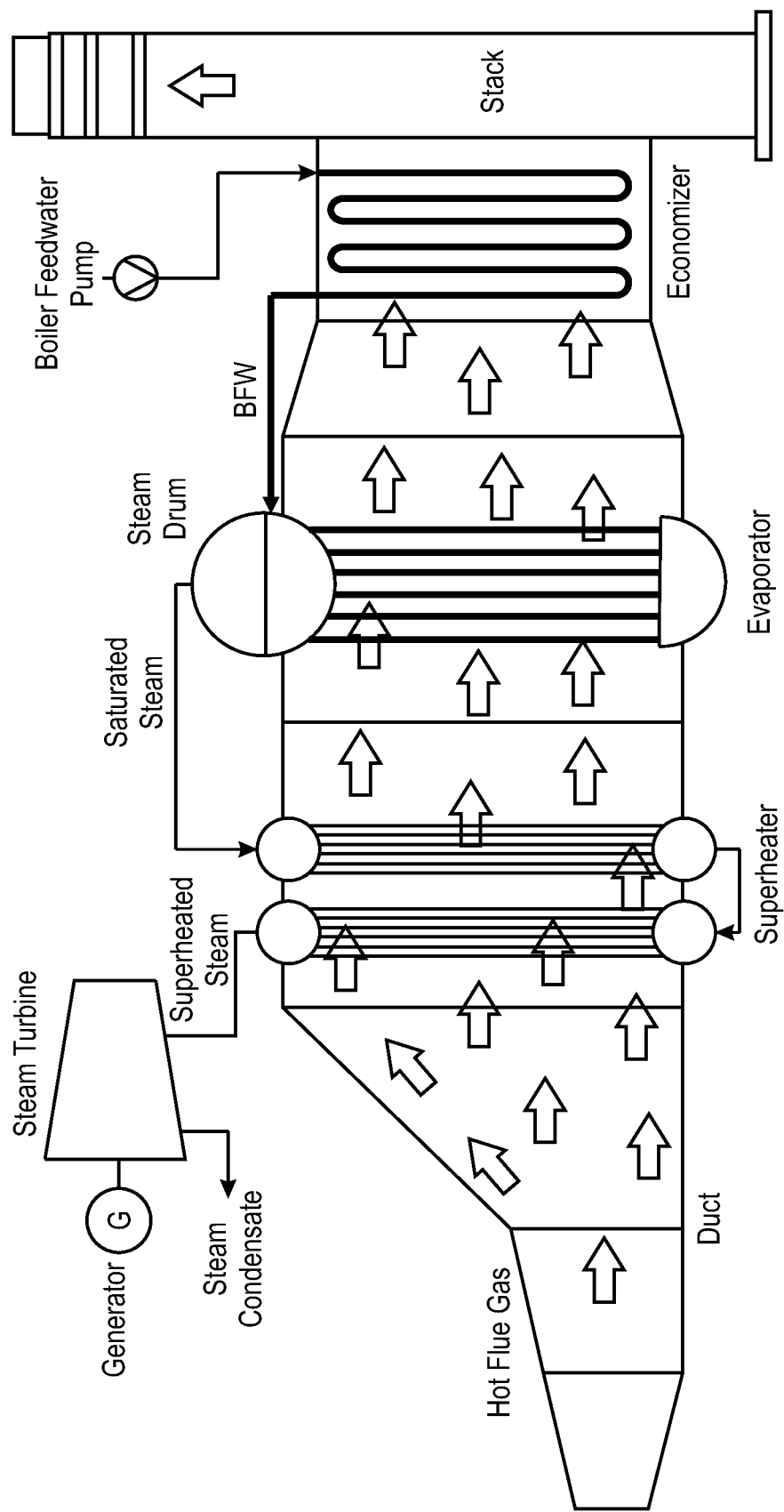
FIG. 8 is a diagram of an example of an HRSG that may be analogous to the HRSG of FIG. 7.

FIG. 8 is an example of a HRSG 800 that may be analogous to the HRSG 700 of FIG. 7. Flue gas (hot combustion gas) from a furnace or burner (that combusts fuel 302 and $H_2$ 218) flows through the HRSG 800 as a heating medium. The HRSG 800 includes the economizer, evaporator, and superheater. Each of these three may be labeled as a heat exchanger. The boiler feedwater and the flue gas may generally flow in a counter current flow with respect to each other through the HRSG 800.

In FIG. 8, the flue gas is received at the front end of the HRSG 800, for example, from the furnace that generates the flue gas. In some implementations of cogeneration or a combined cycle, the hot flue gas may be received from a turbine (e.g., gas turbine) and with the combustion apparatus (e.g., furnace or burner) upstream of the turbine that feeds the hot flue gas to the turbine.

For the HRSG 800, the flue gas flows across the superheater, the evaporator, and the economizer in that order, and discharges through a stack (e.g., flue gas stack) to the environment in the illustrated embodiment. The flue gas may be treated at the stack discharge portion prior to discharge.

A boiler feedwater pump is depicted as providing boiler feedwater to the tubes of the economizer of the HRSG 800. The boiler feedwater (warm BFW) as heated by the economizer flows to the steam drum of the evaporator that vaporizes the liquid boiler feedwater give saturated steam. In some implementations, blowdown water (e.g., 402 of FIG. 4) as CBD and/or IBD may discharge from (be collected from) the steam drum. The evaporator discharges the saturated steam to the superheater that superheats the steam. In the illustrated implementation, the superheater discharges the superheated steam to a steam turbine, as might be implemented in cogeneration or with a combined cycle. The superheated steam drives the steam turbine to generated electricity via a generator coupled to the steam turbine. The superheated steam is condensed via the steam turbine and/or via a downstream condenser heat exchanger to give steam condensate. Some of the steam condensate may be recycled as boiler feedwater for pumping by the boiler feedwater pump.

The HRSG 800 (and HRSG 700) may be or in a power block (power unit) in a power plant or power-generation portion of the NG processing plant (facility). There may be multiple power blocks (each or some having an HRSG) in the power plant or power-generation section of a NG processing plant. Embodiments are directed to such a configuration in which a power plant (power-generation systems) having multiple power blocks is situated in a NG processing plant.

Figure 9:
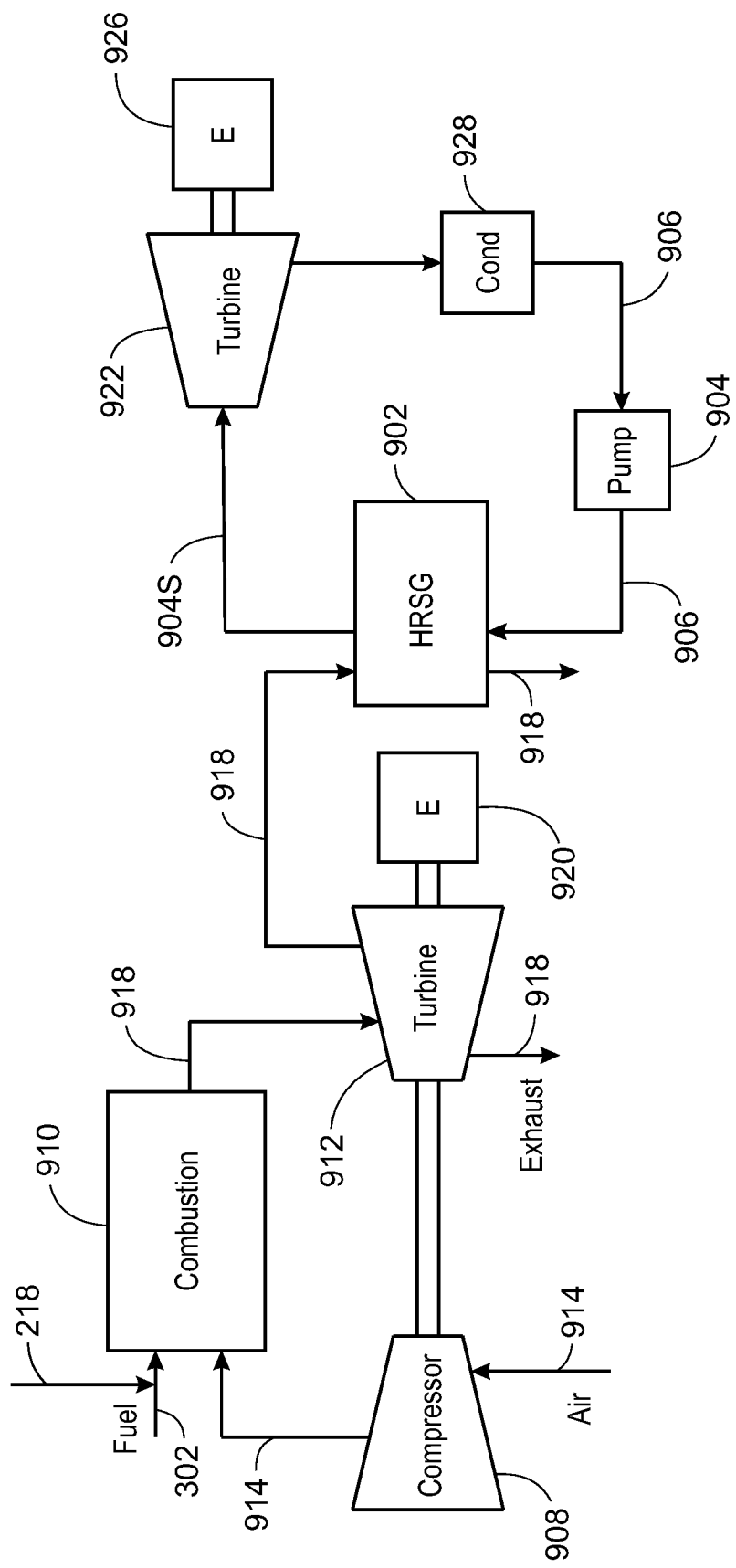
FIG. 9 is a diagram of a combined cycle that employs an HRSG.

FIG. 9 is a combined cycle 900 that may employ an HRSG 902 that may be analogous to an HRSG 210, 700, or 800 of preceding figures. In the illustrated embodiment, the combined cycle 900 is a Brayton-Rankine combined cycle, which combines the Brayton (gas turbine) and Rankine (steam turbine) thermodynamic cycles. The gas turbine (Brayton cycle) can be driven by combustion gas (flue gas). The steam turbine (Rankine cycle) can be driven by steam generated with exhaust waste (flue gas) of the Brayton cycle combustion. The combined cycle 900 may be characterized as a power plant, a unit of power plant, or a power block in a NG processing plant. The combined cycle 900 includes (or relies on) a boiler feedwater pump 904 (a centrifugal pump) that provides boiler feedwater 906 to the HRSG 902 of the combined cycle 900.

The Brayton portion of the combined cycle 900 (Brayton-Rankine) may include an air compressor 908, combustion apparatus 910 (e.g., furnace, burner, furnace having burner), and gas turbine 912. In operation, air 914 is provided to the compressor 908 (e.g., a mechanical compressor). The compressor 908 discharges the air 302 as compressed to the combustion apparatus 910. Fuel 302 to be combusted is also fed to the combustion apparatus 910. The fuel 302 may include, for example, fossil fuels such as natural gas, methane, diesel, oils, and kerosene. In one example, the fuel 302 may be sweet natural gas, as previously discussed. Hydrogen gas 218 may be combined with (added to) the fuel 302, such that the hydrogen gas 218 is combusted along with the fuel 302 in the combustion apparatus 910. The hydrogen gas 218 may be generated via electrolysis of blowdown water, as discussed. The blowdown water subjected to the electrolysis can include blowdown water from the HRSG 902.

The combustion gas 918 (flue gas that is product of the combustion) discharged from the combustion apparatus 910 drives the gas turbine 912. In turn, the gas turbine 922 drives the compressor 908 and a gas-turbine generator 920 that generates electricity. A portion of the combustion gas 918 may discharge from the gas turbine 912 as exhaust. A portion of the combustion gas 918 may discharge from the gas turbine to the HRSG 902 in the Rankine cycle part of the combined cycle 900.

The Rankine portion of the combined cycle 900 (Brayton-Rankine) may include the HRSG 902, steam turbine 922, and condenser 928 (heat exchanger). In operation, the HRSG 902 receives the combustion gas 918 and transfers heat from the combustion gas 918 to the boiler feedwater 906 to vaporize the boiler feedwater 906 into steam. The HRSG 902 may discharge the combustion gas 918, for example, to a flue stack. The HRSG 902 discharges steam 904S (e.g., superheated) to drive the steam turbine 922, which in turn drives the steam-turbine generator 926 that generates electricity. The steam turbine 922 discharges the steam 904S to the condenser 928. The condenser 928 heat exchanger (e.g., shell-and-tube heat exchanger) may employ a cooling medium (e.g., water, such as cooling tower water) to condense the steam. The condenser 928 heat exchanger may discharge the condensed steam (steam condensate) as boiler feedwater 906 to the boiler feedwater pump 904. Fresh boiler feedwater as makeup can be combined with the boiler feedwater 906 from the condenser 928. Lastly, some of the steam that discharges from the turbine 922 can be sent to a steam header for distribution as a heating medium (or for other applications) to users in the NG processing plant.

Figure 10:
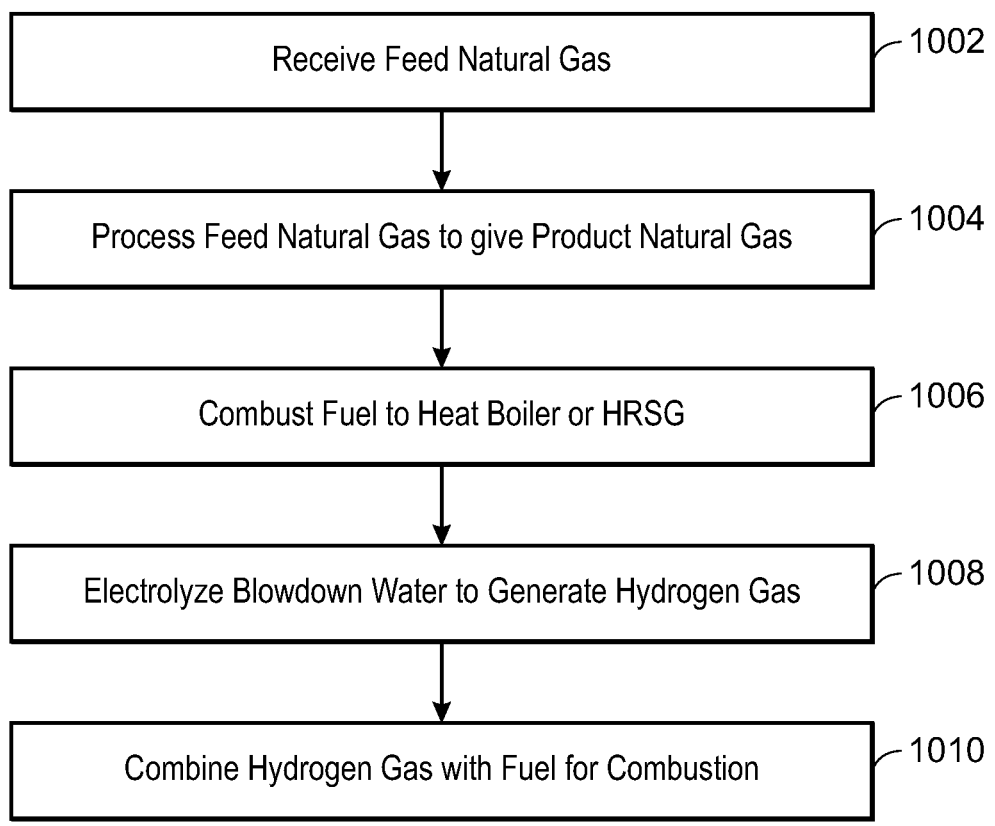
FIG. 10 is a block flow diagram of a method of operating a NG processing plant.

FIG. 10 is a method 1000 of operating a NG processing plant. As discussed, a NG processing plant may receive produced natural gas and remove components, such as acid gas, moisture, and hydrocarbons (heavier than methane), to give product natural gas that is pipeline quality for distribution to users/consumers. As also discussed, an intermediate grade of the natural gas (from points in the processing) may be utilized as fuel gas in the NG processing plant.

At block 1002, the method includes receiving feed natural gas, such as from a wellhead or wellhead system. The wellhead system may be coupled to a wellbore through which the feed natural gas is produced from a subterranean formation. The feed natural gas may be produced natural gas that is (or approximates) raw natural gas as produced from a subterranean formation in the Earth crust. A natural gas pipeline may transport the feed natural gas from the wellhead system to the NG processing plant.

At block 1004, the method includes processing the feed natural gas to give product natural gas. The processing may involve removing impurities, such as acid gas, water, non-methane hydrocarbons, etc., from the feed natural gas. The term "non-methane hydrocarbons" may be defined herein as hydrocarbons not including methane. The non-methane hydrocarbons may include ethane, propane, butane, or pentane, or any combinations thereof.

The processing of the feed natural gas may be for provision of natural gas as product, wherein the processing includes removing the acid gas, the water, and hydrocarbons (each hydrocarbon molecule having more than one carbon atom) with a greater molecular mass (molecular weight, molar mass) than methane from the feed natural gas. The removal of the hydrocarbons (non-methane hydrocarbons) may be in a NGL recovery unit, as discussed.

The acid gas typically includes carbon dioxide or hydrogen sulfide, or both. The acid gas may be removed, for example, in a gas sweetening unit having an amine absorber column that removes (scrubs, absorbs) the acid gas from the feed natural gas. See, for example, FIG. 11. For instances of the acid gas including hydrogen sulfide, the hydrogen sulfide removed from the feed natural gas may be provided to a SRU having a catalytic reactor vessel that converts hydrogen sulfide to elemental sulfur.

The removing of the water from the feed natural gas may involve contacting the feed natural gas with liquid desiccant (e.g., TEG) in a column vessel. See, for example, FIG. 12.

At block 1006, the method includes combusting fuel to heat a boiler or HRSG, or both. Steam may be generated by the combustion via the boiler or the HRSG, or both, wherein the steam is utilized in the NG processing plant as heating medium or to drive a turbine to generate electricity, or a combination thereof. The method may include combusting the fuel via the burner to provide heat for a boiler to generate the steam, and generating additional steam with the HRSG. In some instances, the flue gas may flow from the boiler to the HRSG. In other instances, the HRSG may receive the flue gas from a furnace not associated with an upstream boiler.

For the combustion, the fuel is provided to a burner or furnace having a burner. The fuel is combusted via the burner. The hot flue gas (product of the combustion) discharged from the burner heats the boiler or HRSG, or both. In implementations, the burner can be a component of the boiler. Any flame generated can provide radiant heating water in the boiler to generate steam. Again, the boiler and the HRSG may be heated via the combustion to generate steam. As mentioned, the steam may be utilized as heating medium or to drive a turbine to generate electricity, or a combination thereof.

The fuel may be or include natural gas. In certain implementations, the fuel includes sweet natural gas (sweet gas) that is the feed natural gas after removal of the acid gas and the water but before removal of the non-methane hydrocarbons.

At block 1008, the method includes subjecting blowdown water from the boiler and the HRSG to electrolysis, thereby generating hydrogen gas. The method may include electrolyzing the blowdown water via a water electrolysis unit, thereby generating the hydrogen gas. The water electrolysis unit may include an electrochemical cell having an electrolyte and electrodes (e.g., a cathode and an anode). The electrolyte may include, for example, an alkaline liquid, a solid oxide, or a polymer electrolyte membrane (PEM).

The method may involve treating the blowdown water to lower conductivity of the blowdown water prior to subjecting the blowdown water to the electrolysis. Thus, the method may include treating the blowdown water to lower conductivity of the blowdown water prior to subjecting the blowdown water to electrolysis in the water electrolysis unit.

The method may include discharging the blowdown water from the boiler and the HRSG, such as to an evaporation pond and diverting a portion of the blowdown water as the blowdown water subjected to the electrolysis. The method may include discharging the blowdown water from the boiler and the HRSG to an evaporation pond, diverting a portion of the blowdown water before reaching the evaporation pond, treating the portion to reduce conductivity of the portion, and then subjecting the portion to electrolysis, thereby generating hydrogen gas. The subjecting of the portion of the blowdown water to electrolysis may include performing the electrolysis in the water electrolysis unit having the electrodes and the electrolyte.

Therefore, the method may include discharging the blowdown water from the boiler and the HRSG, providing a first portion of the blowdown water to an evaporation pond, and providing a second portion of the blowdown water as the blowdown water subjected to the electrolysis. As indicated, the method may include treating the second portion of the blowdown water (the portion diverted) to reduce conductivity of the second portion prior to subjecting the second portion to the electrolysis.

At block 1010, the method includes combining the hydrogen gas with the fuel and combusting the hydrogen gas via the burner, such as in the furnace having the burner. The combining of the hydrogen gas with the fuel may give a mixture fed to the burner or furnace (having the burner) for combustion. The mixture may have, for example, less than 50 vol %, less than 20 vol %, or less than 5 vol % of the hydrogen gas. The combining of the hydrogen gas with the fuel may lower the amount of the fuel provided to and combusted by the burner (e.g., in the furnace), thereby reducing emission of carbon dioxide from the NG processing plant.

The method may include combining a first portion of the hydrogen gas with the fuel provided to the burner, and providing a second portion of the hydrogen gas to users external of the NG processing plant. In examples, the first portion of the hydrogen gas in the mixture of the fuel and the first portion of the hydrogen gas is less than 50 vol % of the mixture. Thus, in examples, the volume ratio of hydrogen gas to the fuel for the first portion of the hydrogen gas combined with the fuel is less than 1. The volume ratio of the fuel to the first portion of the hydrogen gas combined with the fuel may be, for example, in the range of 1 to 32. Again, combining hydrogen gas with the fuel lowers an amount of the fuel provided to and combusted by the burner, thereby reducing emission of carbon dioxide to the environment. In implementations, combusting the first portion of the hydrogen gas results in less of the fuel combusted in the furnace, thereby reducing emission of carbon dioxide to the atmosphere. The method may include combusting the fuel and the first portion of the hydrogen gas in a furnace associated with the boiler or the HRSG, or both, to generate steam.

Again, combusting the fuel and the hydrogen gas in the furnace (having a burner, or a region of the boiler having a burner) generates flue gas and heats the boiler or HRSG, or both. The method may include utilizing the steam to drive a turbine, thereby generating electricity for power generation. The method may include utilizing the steam to drive a turbine, thereby generating electricity for power generation. The method may include utilizing the flue gas discharged from the furnace to drive a turbine, thereby generating electricity for power generation.

Figure 11:
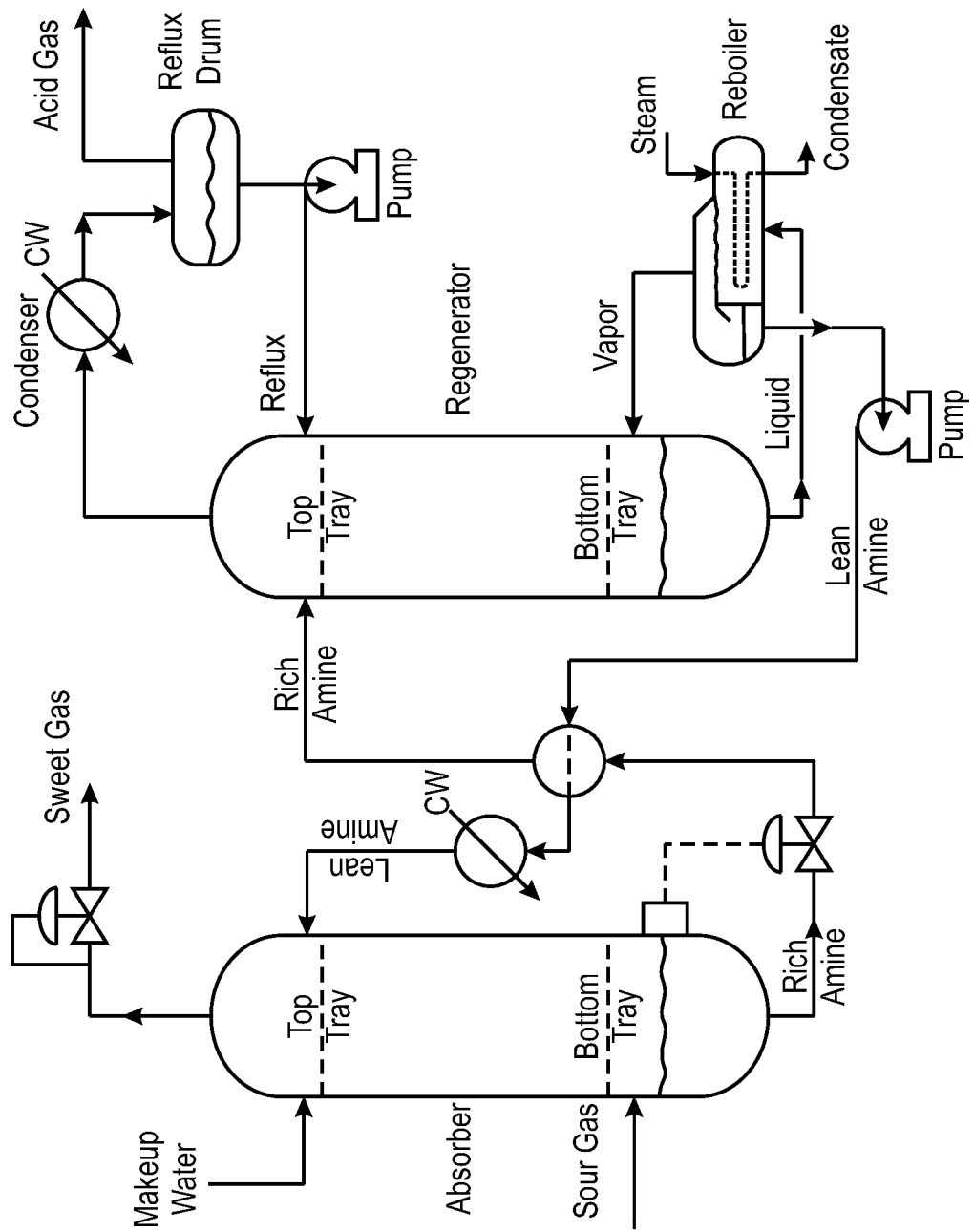
FIG. 11 is a diagram of an example of a gas sweetening system for acid gas removal.

FIG. 11 is an example of system (gas sweetening system) that implements amine gas treatment (amine gas treating), also known as amine scrubbing, gas sweetening, and acid gas removal. The system may be called a gas sweetening unit, and may be implemented as the acid gas removal 200 system of FIG. 2.

In certain implementations, the sweet gas discharged overhead from the first column may be utilized as the fuel 302 of the preceding figures. This sweet gas may be subjected to dehydration (e.g., FIG. 12) before being utilized as the fuel 302.

In implementations such as FIG. 11, the feed natural gas 108 may be fed to the gas sweetening unit. The system depicted in FIG. 11 employs an aqueous solution of an alkylamine(s) (referred to as amine) to remove $H_2S$ and $CO_2$ from sour gas, such as the feed natural gas 104. Gas sweetening units are utilized in NG processing plants, petroleum refineries, petrochemical plants, and other industries. In embodiments herein, the NG processing plant 102 employs the gas sweetening unit (FIG. 11).

Amines utilized in the gas sweetening unit may include diethanolamine (DEA), monoethanolamine (MEA), methyldiethanolamine (MDEA), diisopropanolamine (DIPA), and aminoethoxyethanol (Diglycolamine) (DGA). Amines commonly employed are the alkanolamines DEA, MEA, and MDEA.

The feed natural gas 104 having $H_2S$ (and $CO_2$) is fed to and treated in the sweetening unit to remove the $H_2S$ (and the $CO_2$). The chemistry in the amine treating may vary in particular with the amine. As an example, for MEA denoted as $RNH_2$, the acid-base reaction involves protonation of the amine electron pair to form a positively charged ammonium group $RNH_3^+$, and which can be represented by $RNH_2 + H_2S \leftrightarrows RNH_3^+ + HS^-$ and $RNH_2 + H_2CO_3 \leftrightarrows RNH_3^+ + HCO_3^-$.

The resulting dissociated and ionized species being more soluble in solution are scrubbed by the amine solution and thus removed from the gas phase. At the outlet of the amine scrubber, the gas as sweetened is thus depleted in $H_2S$ and $CO_2$.

The system depicted in FIG. 11 is only an example of a typical amine gas treating process and includes an absorber column and a regenerator distillation column. The sour gas (feed natural gas 104) (e.g., having 5-30 vol % acid gas) enters a bottom portion of the absorber column (vessel) and flows upward through the absorber column. An aqueous solution of amine enters a top portion of the absorber column and flows downward through the absorber column in a countercurrent direction with respect to the sour gas flowing upward. This amine solution that enters the absorber column may be labeled as lean amine in having little or no acid gas. The absorber column may have trays as indicated, or may have packing, to provide surface area for contact of the lean amine with the sour gas and thus give mass transfer stages for absorption of acid gas from the sour gas into the lean amine. Sweet gas having little or no acid gas discharges overhead from the absorber column for further processing in the natural gas processing plant. Rich amine (rich in acid gas by having the acid gas absorbed from the sour gas) discharges from a bottom portion of the absorber column. In the illustrated example, a liquid level of the rich amine solution may be maintained in the bottom portion of the absorber column via a control valve and a level sensor.

The rich amine may flow to the regenerator (regenerator distillation column) that removes the acid gas from the rich amine to discharge the lean amine from a bottom portion of the regenerator. The removed acid gas may discharge overhead from the regenerator and be partially condensed. Reflux may be sent via a reflux drum (vessel) and a reflux pump (e.g., centrifugal pump) to the regenerator. Acid gas ($H_2S$ and $CO_2$) may discharge from the system as gas from the vapor space of the reflux drum. The acid gas may be sent, for instance, to the SRU 202 (e.g., Claus process system) in which the $H_2S$ is converted to elemental sulfur. The lean amine discharges from a bottom portion of the regenerator. The regenerator includes a steam reboiler to vaporize a portion of the lean amine for return to the regenerator. The liquid amine is pumped through a cross exchanger (cooled by the rich amine) and a cooler heat exchanger (e.g., cooling water is cooling medium) for supply to the absorber column.

Figure 12:
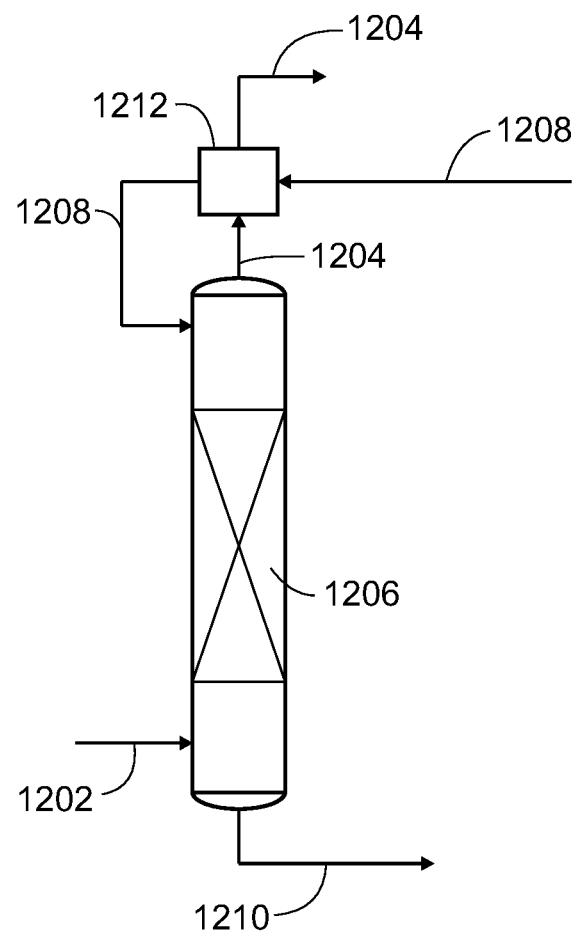
FIG. 12 is a diagram of a contactor column (absorber column) that dehydrates natural gas with a liquid desiccant, such as glycol.

FIG. 12 is a contactor column 1200 (absorber column) that dehydrates natural gas 1202 with a liquid desiccant, such as glycol. The glycol may be triethylene glycol (TEG). The natural gas 1202 can be feed natural gas 104, such as the feed natural gas 104 after being processed in acid removal 200 (FIG. 2). The contactor column 1200 may be part of a natural gas dehydration system (e.g. dehydration 204 of FIG. 2) in a NG processing plant. The contactor column 1200 may receive natural gas from a gas sweetening unit. The dehydration system having the contactor column 1200 may be employed when the natural gas has moisture (water).

In operation, the contactor column 1200 receives wet natural gas 1202, and contacts the natural gas 1202 with TEG as liquid desiccant for the TEG to absorb water from the natural gas 1202. A TEG regeneration system (not shown) regenerates (removes water from) the TEG (rich TEG discharged from the column 1200) to give dried (lean) TEG for re-use as the absorbing TEG in the contactor column 1200.

The contactor column 1200 is a vessel that is an absorption column. The contactor column 1200 employs the TEG to remove (absorb) water from the natural gas 1202 to give the dehydrated (dried) natural gas 1204. The contactor column 1200 may also be called a contactor tower, absorber, absorber column, absorption column, dehydrator, dehydrator column, glycol contactor, glycol contactor column, TEG contactor column, and so forth. The contactor column 1200 utilizes the TEG to dehydrate the natural gas 1202 to give dehydrated natural gas 1204 as product for distribution or further processing in the natural gas processing plant. As denoted by reference numeral 1206, the contactor column 1200 may include column trays (e.g., bubble cap traps, sieve trays, etc.) or packing (e.g., random packing or structured packing) to provide mass-transfer stages and surface area for absorption of water by the TEG from the natural gas.

The natural gas 1202 entering the contactor column 1200 may flow upward through the contactor column 1200. The contactor column 1200 may receive lean TEG 1208 into an upper portion of the contactor column 1200. The term "lean" means that the TEG is lean in water and may have less than 1 wt % water. The contactor column 1200 may receive the lean TEG from a TEG regeneration still column (not shown). The lean TEG 1208 entering the contactor column 1200 may flow downward through the contactor column 1200. Thus, the natural gas and TEG may be in a counter current flow with respect to each other in the contactor column 1200 for the absorption of water from the natural gas into the TEG. The dehydrated natural gas 1204 may discharge overhead from the contactor column 1200 through a discharge conduit. In implementations, the dehydrated natural gas 1204 may have a concentration of water less than 7 pounds per million standard cubic feet. Rich TEG 1210 may discharge through a discharge conduit from a bottom portion of the contactor column 1200. The term "rich" means that the TEG is rich in water, such as saturated (or approaching saturation) in water. The rich TEG 1210 may have a concentration of water of at least 2 weight percent (wt %), such as in a range of 2 wt % to 6 wt %. The rich TEG may be sent to the regeneration system for removal of water to give lean TEG for return to the contactor column 1200. Lastly, prior to the lean TEG 1208 entering the contactor column 1200, the lean TEG 1208 may be cooled in a heat exchanger 1212 (cross-exchanger) with the product (dehydrated) natural gas 1204 discharging overhead from the contactor column 1200 as the cooling medium. The heat exchanger 1212 may be a shell-and-tube heat exchanger, a plate-fin heat exchanger, a jacketed-pipe heat exchanger, etc.

An embodiment is a method of operating a NG processing plant, including receiving feed natural gas (e.g., from a wellhead) and processing the feed natural gas to give product natural gas. The processing includes removing impurities including acid gas (e.g., carbon dioxide or hydrogen sulfide, or both), water, and non-methane hydrocarbons from the feed natural gas. The non-methane hydrocarbons may include ethane, propane, butane, or pentane, or any combinations thereof. In implementations, removing the water from the feed natural gas involves contacting the feed natural gas with liquid desiccant in a column vessel. In implementations, removing the acid gas involves processing the feed natural gas in a gas sweetening unit having an amine absorber column that removes the acid gas from the feed natural gas. In implementations with the acid gas including hydrogen sulfide, and the method may involve providing the hydrogen sulfide removed from the feed natural gas to an SRU having a reactor vessel (e.g., a catalytic reactor) that converts hydrogen sulfide to elemental sulfur.

The method includes providing fuel to a furnace and combusting the fuel in the furnace to heat a boiler to generate steam. The method includes flowing flue gas through an HRSG to generate steam. The generated steam may be utilized in the NG processing plant as a heating medium or to drive a turbine to generate electricity, or a combination thereof.

The method includes subjecting blowdown water from the boiler and the HRSG to electrolysis, thereby generating hydrogen gas. The method may include treating the blowdown water to lower conductivity of the blowdown water prior to subjecting the blowdown water to the electrolysis. The method may include discharging the blowdown water from the boiler and the HRSG, providing a first portion of the blowdown water to an evaporation pond, and providing a second portion of the blowdown water as the blowdown water subjected to the electrolysis. If so, the method may include treating the second portion to reduce conductivity of the second portion prior to subjecting the second portion to the electrolysis.

The method includes combining the hydrogen gas (generated via the electrolysis of the blowdown water) with the fuel and combusting the hydrogen gas in the furnace. In implementations, the combining of the hydrogen gas with the fuel gives a mixture fed to the furnace for combustion, the mixture having less than 50 vol % of the hydrogen gas. In implementations, the fuel includes sweet natural gas that is the feed natural gas after removal of the acid gas and the water but before removal of the non-methane hydrocarbons. In implementations, the combining of the hydrogen gas with the fuel lowers an amount of the fuel provided to and combusted in the furnace, thereby reducing emission of carbon dioxide from the natural gas processing plant.

Another embodiment is a method of operating a NG processing plant, includes receiving feed natural gas from a wellhead and removing impurities including acid gas (e.g., carbon dioxide or hydrogen sulfide, or both), water, and hydrocarbons from the feed natural gas to give product natural gas. The hydrocarbons in the feed natural gas and removed from the feed natural gas may include, for example, ethane, propane, butane, or pentane, or any combinations thereof. The removing of the acid gas may involve processing the feed natural gas in a gas sweetening unit having an amine absorber column.

The method includes providing fuel (e.g., natural gas) to a burner, combusting the fuel via the burner to provide heat for a boiler to generate steam, and generating additional steam with an HRSG. The method includes discharging blowdown water from the boiler and the HRSG and electrolyzing the blowdown water via a water electrolysis unit, thereby generating hydrogen gas. The water electrolysis unit includes an electrochemical cell having a cathode, an anode, and an electrolyte. The method includes combining a first portion of the hydrogen gas with the fuel provided to the burner. The method may include providing a second portion of the hydrogen gas to users external of the natural gas processing plant. In implementations, a volume ratio of hydrogen gas to the fuel for the first portion of the hydrogen gas combined with the fuel is less than 1. In implementations, a volume ratio of the fuel to the first portion of the hydrogen gas combined with the fuel is in a range of 1 to 32. In implementations, the combining of the first portion of the hydrogen gas with the fuel lowers an amount of the fuel provided to and combusted by the burner, thereby reducing emission of carbon dioxide to environment.

The method may include treating the blowdown water to lower conductivity of the blowdown water prior to subjecting the blowdown water to electrolysis in the water electrolysis unit. In implementations, the discharging of the blowdown water from the boiler and the HRSG includes discharging the blowdown water to an evaporation pond and diverting a portion of the blowdown water as the blowdown water subjected to the electrolyzing.

Yet another embodiment is a method of operating a natural gas processing plant, including receiving feed natural gas from a wellhead system coupled to a wellbore through which the feed natural gas is produced from a subterranean formation. The method includes processing the feed natural gas for provision of natural gas as product, wherein the processing includes removing acid gas (e.g., carbon dioxide or hydrogen sulfide, or both), water, and hydrocarbons having a greater molecular mass than methane from the feed natural gas. The hydrocarbons may include, for example, ethane, propane, butane, or pentane, or any combinations thereof.

The method includes discharging blowdown water from a boiler and an HRSG to an evaporation pond, and diverting a portion of the blowdown water before reaching the evaporation pond. The method includes treating the diverted portion to reduce conductivity of the portion and subjecting the portion to electrolysis, thereby generating hydrogen gas. The subjecting of the portion of the blowdown water to electrolysis may involve performing the electrolysis in a water electrolysis unit having electrodes and an electrolyte. The electrolyte may be, for example, an alkaline liquid, a solid oxide, or a PEM.

The method includes combusting fuel and a first portion of the hydrogen gas in a furnace associated with the boiler or the HRSG, or both, to generate steam. The method may include providing a second portion of the hydrogen gas to a user external of the natural gas processing plant. The combusting of the first portion of the hydrogen gas may result in less of the fuel combusted in the furnace, thereby reducing emission of carbon dioxide to the atmosphere. The furnace may include a burner for combusting the fuel and the first portion of the hydrogen gas. The method may include utilizing flue gas discharged from the furnace to drive a turbine, thereby generating electricity for power generation. The method may include utilizing the steam generated as a heating medium. The method may include utilizing the steam generated to drive a turbine, thereby generating electricity for power generation. The steam may be utilized as a heating medium or to drive a turbine to generate electricity, or both.

A number of implementations have been described. Nevertheless, it will be understood that various modifications may be made without departing from the spirit and scope of the disclosure.

What is claimed is:

1. A method of operating a natural gas processing plant, comprising:
   receiving feed natural gas;
   processing the feed natural gas to give product natural gas, wherein the processing comprises removing impurities comprising acid gas, water, and non-methane hydrocarbons from the feed natural gas;
   providing a portion of the processed feed natural gas as fuel to a furnace;
   combusting the fuel in the furnace to heat a boiler to generate steam;
   flowing flue gas through a heat recovery steam generator (HRSG) to generate steam;
   subjecting blowdown water from the boiler and the HRSG to electrolysis, thereby generating hydrogen gas; and
   combining the hydrogen gas with the fuel and combusting the hydrogen gas in the furnace.

2. The method of claim 1, wherein receiving the feed natural gas comprises receiving the feed natural gas from a wellhead, wherein the acid gas comprises carbon dioxide or hydrogen sulfide, or both, and wherein the non-methane hydrocarbons comprise ethane, propane, butane, or pentane, or any combinations thereof.

3. The method of claim 1, wherein removing the acid gas comprises processing the feed natural gas in a gas sweetening unit comprising an amine absorber column that removes the acid gas from the feed natural gas, and wherein removing the water from the feed natural gas comprises contacting the feed natural gas with liquid desiccant in a column vessel.

4. The method of claim 1, wherein the acid gas comprises hydrogen sulfide, and wherein the method comprises providing the hydrogen sulfide removed from the feed natural gas to a sulfur recovery unit (SRU) comprising a reactor vessel that converts hydrogen sulfide to elemental sulfur.

5. The method of claim 1, comprising treating the blowdown water to lower the conductivity of the blowdown water prior to subjecting the blowdown water to the electrolysis, wherein the steam is utilized as a heating medium or to drive a turbine to generate electricity, or a combination thereof.

6. The method of claim 1, comprising:
   discharging the blowdown water from the boiler and the HRSG;
   providing a first portion of the blowdown water to an evaporation pond; and
   providing a second portion of the blowdown water as the blowdown water subjected to the electrolysis.

7. The method of claim 6, comprising treating the second portion to reduce conductivity of the second portion prior to subjecting the second portion to the electrolysis, wherein combining the hydrogen gas with the fuel gives a mixture fed to the furnace for combustion, the mixture comprising less than 50 volume percent (vol %) of the hydrogen gas.

8. The method of claim 6, wherein the fuel comprises sweet natural gas comprising the feed natural gas after removal of the acid gas and the water but before removal of the non-methane hydrocarbons, and wherein combining the hydrogen gas with the fuel lowers an amount of the fuel provided to and combusted in the furnace, thereby reducing emission of carbon dioxide from the natural gas processing plant.

9. A method of operating a natural gas processing plant, comprising:
   receiving feed natural gas from a wellhead;
   removing impurities comprising acid gas, water, and hydrocarbons from the feed natural gas to give product natural gas;
   providing a portion of the product natural gas as a fuel to a burner;
   combusting the fuel via the burner to provide heat for a boiler to generate steam;
   generating additional steam with a heat recovery steam generator (HRSG);
   discharging blowdown water from the boiler and the HRSG;
   electrolyzing the blowdown water via a water electrolysis unit, thereby generating hydrogen gas, wherein the water electrolysis unit comprises an electrochemical cell comprising a cathode, an anode, and an electrolyte; and
   combining a first portion of the hydrogen gas with the fuel provided to the burner.

10. The method of claim 9, comprising treating the blowdown water to lower conductivity of the blowdown water prior to subjecting the blowdown water to electrolysis in the water electrolysis unit, wherein the fuel comprises natural gas, and wherein a volume ratio of hydrogen gas to the fuel for the first portion of the hydrogen gas combined with the fuel is less than 1.

11. The method of claim 9, wherein the fuel comprises natural gas, wherein a volume ratio of the fuel to the first portion of the hydrogen gas combined with the fuel is in a range of 1 to 32, and wherein combining the first portion with the fuel lowers an amount of the fuel provided to and combusted by the burner, thereby reducing emission of carbon dioxide to the environment.

12. The method of claim 9, comprising providing a second portion of the hydrogen gas to users external of the natural gas processing plant, wherein the acid gas comprises carbon dioxide or hydrogen sulfide, or both, and wherein the hydrocarbons comprise ethane, propane, butane, or pentane, or any combinations thereof.

13. The method of claim 9, wherein removing the acid gas comprises processing the feed natural gas in a gas sweetening unit comprising an amine absorber column.

14. The method of claim 9, wherein discharging the blowdown water from the boiler and the HRSG comprises discharging the blowdown water to an evaporation pond and diverting a portion of the blowdown water as the blowdown water subjected to the electrolyzing.

15. A method of operating a natural gas processing plant, comprising:
receiving feed natural gas from a wellhead system coupled to a wellbore through which the feed natural gas is produced from a subterranean formation;
processing the feed natural gas for provision of natural gas as a product, wherein the processing comprises removing acid gas, water, and hydrocarbons having a greater molecular mass than methane from the feed natural gas;
discharging blowdown water from a boiler and a heat recovery steam generator (HRSG) to an evaporation pond;
diverting a portion of the blowdown water before reaching the evaporation pond;
treating the portion to reduce conductivity of the portion and subjecting the portion to electrolysis, thereby generating hydrogen gas;
combusting fuel including a portion of the product and a first portion of the hydrogen gas in a furnace associated with the boiler or the HRSG, or both, to generate steam.

16. The method of claim 15, comprising utilizing the steam as a heating medium, wherein the acid gas comprises carbon dioxide or hydrogen sulfide, or both, and wherein the hydrocarbons comprise ethane, propane, butane, or pentane, or any combinations thereof.

17. The method of claim 15, comprising utilizing the steam to drive a turbine, thereby generating electricity for power generation, wherein the furnace comprises a burner for combusting the fuel and the first portion of the hydrogen gas.

18. The method of claim 15, comprising utilizing flue gas discharged from the furnace to drive a turbine, thereby generating electricity for power generation, wherein combusting the first portion of the hydrogen gas results in less of the fuel combusted in the furnace, thereby reducing emission of carbon dioxide to atmosphere.

19. The method of claim 15, comprising providing a second portion of the hydrogen gas to a user external of the natural gas processing plant, wherein subjecting the portion of the blowdown water to electrolysis comprises performing the electrolysis in a water electrolysis unit comprising electrodes and an electrolyte.

20. The method of claim 19, wherein the electrolyte comprises an alkaline liquid, a solid oxide, or a polymer electrolyte membrane (PEM), and wherein the steam is utilized as a heating medium or to drive a turbine to generate electricity, or a combination thereof.

\* \* \* \* \*